United States Patent
Suzuki

(10) Patent No.: US 12,479,120 B2
(45) Date of Patent: Nov. 25, 2025

(54) SLITTER-SCORER APPARATUS

(71) Applicant: KABUSHIKI KAISHA ISOWA, Kasugai (JP)

(72) Inventor: Yukiomi Suzuki, Kasugai (JP)

(73) Assignee: KABUSHIKI KAISHA ISOWA, Aichi (JP)

( * ) Notice: Subject to any disclaimer, the term of this patent is extended or adjusted under 35 U.S.C. 154(b) by 621 days.

(21) Appl. No.: 17/887,084

(22) Filed: Aug. 12, 2022

(65) Prior Publication Data
US 2023/0063869 A1   Mar. 2, 2023

(30) Foreign Application Priority Data
Aug. 30, 2021   (JP) .................................. 2021-139865

(51) Int. Cl.
B26D 5/06   (2006.01)
B26D 1/24   (2006.01)
(Continued)

(52) U.S. Cl.
CPC ............... *B26D 5/06* (2013.01); *B26D 3/085* (2013.01); *B26D 9/00* (2013.01); *B26D 11/00* (2013.01);
(Continued)

(58) Field of Classification Search
CPC ................ G05B 19/195; G05B 19/418; G05B 19/41865; G05B 2219/45039;
(Continued)

(56) References Cited

U.S. PATENT DOCUMENTS 5,125,301 A * 6/1992 Miller .................. G05B 19/195
                                                  83/13
5,761,980 A * 6/1998 Ima ......................... B26D 7/20
                                                  83/508.3
(Continued)

FOREIGN PATENT DOCUMENTS

DE           4226075 A1 * 2/1994 ........... B23D 35/008
JP         S 55-70222 U     5/1980
(Continued)

OTHER PUBLICATIONS

English language translation of DE-4226075-A1 to Kunz et al.*
English language translation of WO-2010105719-A1 to Erler et al.*

*Primary Examiner* — Evan H MacFarlane
(74) *Attorney, Agent, or Firm* — Crowell & Moring LLP

(57) ABSTRACT

A slitter-scorer apparatus comprises: a corrugated paperboard-processing tool comprising a plurality of slitters and a plurality of scorers; a width directional movement mechanism and an up-down directional movement mechanism configured to move the corrugated paperboard-processing tool in a width direction and an up-down direction, respectively; and a control device configured to control the two movement mechanisms. The control device is configured to: set a target setup time for moving the corrugated paperboard-processing tool for an order change, based on a cutter cutoff length of a portion of a corrugated paperboard to be cut off by a cutter during the order change, and a paperboard feed speed; set a target acceleration/deceleration so as to allow the movement of the corrugated paperboard-processing tool to be completed in the target setup time; and control the movement mechanisms to move the corrugated paperboard-processing tool with the target acceleration/deceleration.

12 Claims, 14 Drawing Sheets

(51) Int. Cl.
  *B26D 3/08* (2006.01)
  *B26D 9/00* (2006.01)
  *B26D 11/00* (2006.01)

(52) U.S. Cl.
  CPC ........ *B26D 1/245* (2013.01); *B26D 2011/005* (2013.01)

(58) Field of Classification Search
  CPC ........ B65H 35/02; B65H 35/04; B65H 35/06; B65H 35/08; B26D 1/225; B26D 1/245; B26D 3/085; B26D 5/005; B26D 5/02; B26D 5/04; B26D 5/06; B26D 7/2635; B26D 9/00; B26D 11/00; B26D 2011/005; B26D 2007/0068; B31B 50/16; B31B 50/18; B31B 50/20
  See application file for complete search history.

(56) References Cited

U.S. PATENT DOCUMENTS

| | | | | |
|---|---|---|---|---|
| 6,893,520 B2* | 5/2005 | Cummings | ............ | B26D 5/32 156/271 |
| 7,568,411 B2* | 8/2009 | Cummings | ............ | B26D 5/00 156/207 |
| 7,568,412 B2* | 8/2009 | Cummings | ............ | B26D 1/245 156/207 |
| 8,267,847 B2* | 9/2012 | Cummings | ......... | B26D 7/2635 83/499 |
| 9,933,777 B2* | 4/2018 | Cummings | ...... | G05B 19/41865 |
| 2001/0002560 A1* | 6/2001 | Aoki | .................... | B26D 7/2635 83/13 |
| 2004/0159693 A1 | 8/2004 | Adachi et al. | | |
| 2004/0173068 A1 | 9/2004 | Adachi | | |
| 2011/0219924 A1* | 9/2011 | Cummings | ............... | B31F 1/26 83/39 |
| 2022/0040949 A1* | 2/2022 | Mizutani | .............. | B31B 50/006 |

FOREIGN PATENT DOCUMENTS

| | | |
|---|---|---|
| JP | S 64-71614 A | 3/1989 |
| JP | H 01-306697 A | 12/1989 |
| JP | 2004-276231 A | 10/2004 |
| JP | 3717167 B2 | 11/2005 |
| WO | WO-2010105719 A1 * | 9/2010 ............ B65H 35/02 |

* cited by examiner

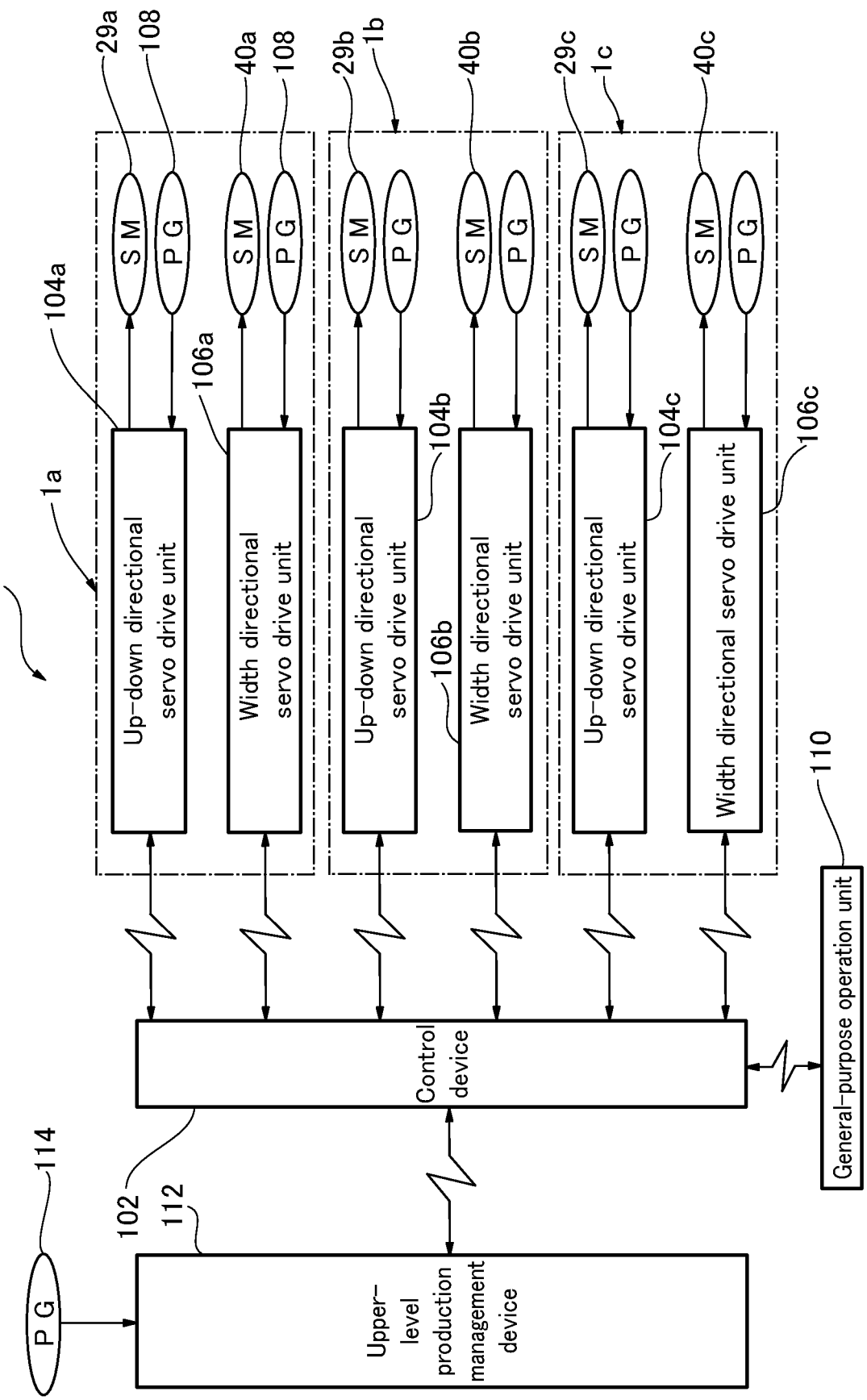

FIG.12

| | Width Directional Movement Distance of Slitter (mm) | | | |
|---|---|---|---|---|
| | 0 ~ 25 | 26 ~ 50 | 51 ~ 75 | 76 ~ 100 |
| 0 ~ 125 | 5.2 | 7.0 | 8.6 | 10.0 |
| 126 ~ 150 | 7.5 | 10.1 | 12.3 | 14.4 |
| 151 ~ 175 | 10.2 | 13.7 | 16.8 | 19.6 |
| 176 ~ 200 | 13.4 | 17.9 | 21.9 | 25.6 |
| 200 ~ 250 | 16.9 | 22.7 | 27.8 | 32.4 |
| 251 ~ 275 | 20.9 | 20.8 | 34.3 | 40.0 |

Paperboard Feed Speed (m/s)

SLITTER-SCORER APPARATUS

RELATED APPLICATIONS

This application claims priority to Japanese Patent Application No. 2021-139865, filed on Aug. 30, 2021, the entire content of which is incorporated herein by reference.

BACKGROUND OF THE INVENTION

1. Field of the Invention

The present invention relates to a slitter-scorer apparatus configured to perform processing for giving slit lines and score lines to a corrugated paperboard being continuously fed along a feed line.

2. Description of the Related Art

Heretofore, a slitter-scorer apparatus for giving slit lines and score lines to a corrugated paperboard (corrugated paperboard web) being continuously fed has been provided on a production line of a corrugated paperboard production apparatus (corrugator). Specifically, the slitter-scorer apparatus comprises, as a corrugated paperboard-processing tool: a plurality of slitters arranged in parallel in a width direction orthogonal to a feed direction (conveyance direction) of a corrugated paperboard and configured to give slit lines to the corrugated paperboard along the feed direction by a slitter knife; and a plurality of scorers arranged in parallel in the width direction and configured to give score lines to the corrugated paperboard along the feed direction by a roll.

In such a slitter-scorer apparatus, for example, in order to change a desired number of output webs to be obtained by dividing the corrugated paperboard in the width direction, a width directional length of each of the output webs, the position of each score line to be given to the corrugated paperboard, etc., i.e., for a change between two successive production orders (so-called "order change"), an operation of moving the corrugated paperboard-processing tool in the width direction and an up-down direction is performed. Specifically, when performing the order change, each of the plurality of slitters and the plurality of scorers as the corrugated paperboard-processing tool is moved in width direction and the up-down direction, such that it is shifted from a position set in the previous order to a position to be set for a new order.

In this situation, a portion of the corrugated paperboard which has advanced in the feed direction while the corrugated paperboard-processing tool is being moved for the order change becomes a defective zone. This defective zone is a portion which does not meet requirements of processed corrugated paperboards (non-defective sheets) to be produced in each of previous and new orders, typically a portion in which no slit or score line is given (or a portion partly formed with an obliquely-extending slit or score line).

Here, with a view to improving the yield of processed corrugated paperboards to be produced by reducing the length of the defective zone along the feed direction (this length will hereinafter be referred to as "defective length", as appropriate), there has heretofore been proposed a technique designed to reduce a time required to move the corrugated paperboard-processing tool for the order change (this time will hereinafter be referred to as "setup time", as appropriate) (see JP-B 3717167 (Patent Document 1), for example). Typically, there has been known a technique of moving the corrugated paperboard-processing tool as quickly as possible during the order change so as to reduce the setup time. In a preferred example, each of an acceleration and a deceleration (hereinafter referred to collectively as "acceleration/deceleration") with which the corrugated paperboard-processing tool is moved in the up-down direction and the width direction during the order change is set to a maximum acceleration/deceleration determined by performance of a movement mechanism (such as a motor) for the corrugated paperboard-processing tool, thereby most quickly moving the corrugated paperboard-processing tool. According to this example, the setup time is minimized, and thus the defective length is minimized.

SUMMARY OF THE INVENTION

Technical Problem

Meanwhile, in the corrugated paperboard production apparatus, a cutter is provided downstream of the slitter-scorer apparatus to cut, along the width direction, the corrugated paperboard scored and slit (divided) by the slitter-scorer apparatus (i.e., the output webs). Normally, the aforementioned defective zone of the corrugated paperboard which occurred during the order change is cut off by the cutter. In one example, from a viewpoint of reliably cutting off the defective zone, etc., the cutter is controlled to cut off a portion of the corrugated paperboard ranging more widely than the defective zone. In this example, the cutter is controlled such that a length along the feed direction of a portion of the corrugated paperboard to be cut off by the cutter during the order change (this length will hereinafter be referred to as "cutter cutoff length") becomes a (predetermined) fixed length which is somewhat longer than the defective length. For example, a defective zone-including portion of the corrugated paperboard (defective sheet) cut off by the cutter in the above manner can be utilized as an underlay board for a stack of non-defective sheets, or the like. In this case, the fixed length is set based on a length required for such an underlay board or the like.

In another example, from a viewpoint of prioritizing the improvement in yield of processed corrugated paperboards to be produced, the cutter is controlled to cut off the defective zone of the corrugated paperboard, in just the right length. That is, in this example, the cutter is controlled during the order change, under the condition that the cutter cutoff length is set to the defective length itself (or may be set to be slightly longer than the defective length (to a length derived by adding a margin to the defective length)). Meanwhile, for reasons of performance of the cutter, the length of a portion of the corrugated paperboard which can be cut off by the cutter has a limited value (minimum length). This limited value (hereinafter referred to as "limited cutter cutoff length", as appropriate) depends on a feed speed (feed rate) of the corrugated paperboard. Specifically, the limited cutter cutoff length becomes longer as the feed speed becomes higher. Here, in the above another example, when the limited cutter cutoff length is longer than the defective length, the cutter is controlled to cut the corrugated paperboard at the limited cutter cutoff length, because the cutter cannot cut the corrugated paperboard at the defective length, for reasons of its performance. In other words, in this situation, the cutter is controlled under the condition that the cutter cutoff length is set to the limited cutter cutoff length, because the cutter cutoff length cannot be set to the defective length.

On the other hand, the defective length can be reduced by moving the corrugated paperboard-processing tool with a relatively large acceleration/deceleration so as to reduce the setup time during the order change, as mentioned above. Then, the cutter is controlled under the condition that the cutter cutoff length is set to the defective length reduced in the above manner. This makes it possible to minimize a portion of the corrugated paperboard (defective sheet) to be cut off by the cutter during the order change, thereby improving the yield of processed corrugated paperboards to be produced. However, in the case where not the defective length but the fixed length or the limited cutter cutoff length is adopted as the cutter cutoff length, the operation of moving the corrugated paperboard-processing tool with a relatively large acceleration/deceleration so as to reduce the setup time during the order change does not lead to the improvement in yield of processed corrugated paperboards. This is because even if the defective length is reduced by moving the corrugated paperboard-processing tool with a relatively large acceleration/deceleration, the cutter is controlled to cut the corrugated paperboard at the fixed length (as which a length longer than the defective length is adopted), regardless of the magnitude of the defective length, or to cut the corrugated paperboard at the limited cutter cutoff length longer than the defective length, because the cutter cannot cut the corrugated paperboard at the defective length.

If the corrugated paperboard-processing tool is moved with a relatively large acceleration/deceleration, particularly with the maximum acceleration/deceleration on performance of the movement mechanism for the corrugated paperboard-processing tool, even in the situation where such an operation does not lead to the improvement in the yield, an unnecessary load will be imposed on the movement mechanism. This will result in acceleration of aging of the movement mechanism for the corrugated paperboard-processing tool (such as wear of ball screws).

The present invention has been made to solve the above technical problems, and an object thereof is to provide a slitter-scorer apparatus capable of, during an order change, ensuring the yield of processed corrugated paperboards to be produced, while suppressing the progression of aging of a movement mechanism for a corrugated paperboard-processing tool.

Solution to Problem

In order to achieve the object, the present invention provides a slitter-scorer apparatus configured to perform processing for giving slit lines and score lines to a corrugated paperboard being continuously fed along a feed line. The slitter-scorer apparatus comprises: a corrugated paperboard-processing tool comprising a plurality of slitters arranged in parallel in a width direction orthogonal to a feed direction of a corrugated paperboard and configured to give slit lines to the corrugated paperboard along the feed direction, and a plurality of scorers arranged in parallel in the width direction and configured to give score lines to the corrugated paperboard along the feed direction; a width directional movement mechanism configured to move, in the width direction, each of the plurality of slitters and each of the plurality of scorers in the corrugated paperboard-processing tool; an up-down directional movement mechanism configured to move, in an up-down direction, each of the plurality of slitters and each of the plurality of scorers in the corrugated paperboard-processing tool; and a control device configured to control the width directional movement mechanism and the up-down directional movement mechanism, wherein a cutter is provided on a downstream side of the slitter-scorer apparatus in the feed direction to cut, along the width direction, the corrugated paperboard processed by the slitter-scorer apparatus, and wherein the control device is configured to: set a target setup time for moving the corrugated paperboard-processing tool in the width direction and the up-down direction so as to change a position of the corrugated paperboard-processing tool for an order change of processed corrugated paperboards to be produced, based on a given cutoff length (cutter cutoff length) along the feed direction of a portion of the corrugated paperboard to be cut off by the cutter during the order change, and a feed speed of the corrugated paperboard; set a target acceleration/deceleration with which the corrugated paperboard-processing tool is to be moved during the order change, such that a movement of the corrugated paperboard-processing tool for the order change is completed in the target setup time; and control the width directional movement mechanism and the up-down directional movement mechanism, such that the corrugated paperboard-processing tool is moved with the target acceleration/deceleration during the order change.

In the present invention having the above feature, the control device operates to set the target acceleration/deceleration depending on the cutter cutoff length to be adopted during the order change, and a current feed speed of the corrugated paperboard (hereinafter referred to as "paperboard feed speed", as appropriate), differently from a comparative example in which the target acceleration/deceleration is set from a viewpoint of reducing the setup time, i.e., with a view to reducing the setup time, the target acceleration/deceleration is set to a relatively large value (typically to a maximum value determined by performance of the movement mechanism, or the like). According to this feature, the target acceleration/deceleration is set to a value appropriate to the current cutter cutoff length and the paperboard feed speed, instead of being uniformly set to a relatively large value, as in the comparative example (basically, the target acceleration/deceleration in the present invention tends to become smaller than that in the comparative example).

This makes it possible to reduce a load imposed on the movement mechanism (width directional movement mechanism and up-down directional movement mechanism) for the corrugated paperboard-processing tool during the order change to appropriately suppress the progression of aging of the movement mechanism (wear of ball screws, etc.). On the other hand, in the present invention and the comparative example, since the corrugated paperboard is cut by the cutter at the same cutter cutoff length during the order change, the length of a resulting defective sheet is the same. Thus, in the present invention, it is possible to appropriately ensure the yield of processed corrugated paperboards to be produced, as with the comparative example.

Accordingly, the slitter-scorer apparatus of the present invention makes it possible to, during an order change, ensure the yield of processed corrugated paperboards to be produced, while suppressing the progression of aging of for the movement mechanism for the corrugated paperboard-processing tool.

Preferably in the slitter-scorer apparatus of the present invention, the control device is configured to set the target acceleration/deceleration such that the movement of the corrugated paperboard-processing tool for the order change is completed in the target setup time, based on the given cutoff length, the feed speed, and a width directional movement distance and an up-down directional movement distance by which the corrugated paperboard-processing tool is to be moved for the order change.

According to this feature, the target acceleration/deceleration is set based on the given cutoff length, the feed speed, the width directional movement distance and the up-down directional movement distance, so that it is possible to accurately set the target acceleration/deceleration so as to adequately realize the target setup time.

More preferably, in the above slitter-scorer apparatus, the control device is configured to refer to a matrix table in which four parameters consisting of the given cutoff length, the feed speed, the width directional movement distance and the up-down directional movement distance are preliminarily associated with the target acceleration/deceleration to be adopted correspondingly to the four parameters, and set the target acceleration/deceleration corresponding to values of the four parameters to be set during the order change.

According to this feature, the target acceleration/deceleration is set using the preliminarily-created matrix table, so that it is possible to simplify processing required for the setting of the target acceleration/deceleration. Specifically, as compared with a case where the target acceleration/deceleration is set by performing computational processing or the like, when the target acceleration/deceleration is set using the matrix table, control processing during the order change is not complicated, so that it is possible to suppress the occurrence of operating delay, etc.

More preferably, the control device is configured to adopt, as the width directional movement distance, a greatest one of a plurality of width directional movement distances by which the plurality of slitters are to be moved during the order change, respectively, and a greatest one of a plurality of width directional movement distances by which the plurality of scorers are to be moved during the order change, respectively.

According to this feature, the target acceleration/deceleration is set based on the greatest width directional movement distance during the order change among those of the plurality of slitters, and the greatest width directional movement distance during the order change among those of the plurality of scorers, so that the target acceleration/deceleration is set to a larger value, as compared with a case of using other non-greatest width directional movement distances. Thus, the width directional movements of all the plurality of slitters required for the order change and the width directional movements of all the plurality of scorers required for the order change can be reliably completed in the setup time.

Alternatively, the control device is configured to adopt, as the width directional movement distance, a plurality of width directional movement distances by which the plurality of slitters are to be moved for the order change, respectively, and a plurality of width directional movement distance by which the plurality of scorers are to be moved for the order change, respectively.

According to this feature, based on the plurality of width directional movement distances by which the plurality of slitters are to be moved for the order change, respectively, the target acceleration/deceleration is set for each of the slitters, individually, such that each of the slitters satisfies the setup time, and based of the plurality of width directional movement distances by which the plurality of scorers are to be moved for the order change, respectively, the target acceleration/deceleration is set for each of the scorers, individually, such that each of the scorers satisfies the setup time. In this case, as compared with the case where a common target acceleration/deceleration is set for a plurality of corrugated paperboard-processing tool elements, the target acceleration/deceleration to be adopted for a corrugated paperboard-processing tool element having a relatively short width directional movement distance becomes smaller. Thus, it is possible to effectively reduce a load imposed on the movement mechanism for the corrugated paperboard-processing tool.

More preferably, the control device is configured to adopt, as the up-down directional movement distance, a distance depending on a thickness of a thicker one of two types of corrugated paperboards used before and after the order change.

According to this feature, the target acceleration/deceleration is set based on the up-down directional movement distance depending on the thickness of a thicker one of two types of corrugated paperboards used before and after the order change, so that the target acceleration/deceleration is set to a larger value, as compared with a case of using the up-down directional movement distance depending on the thickness of a thinner one of the two types of corrugated paperboards. Thus, the up-down directional movement to be performed during the order change depending on the thicknesses of the corrugated paperboards used in the previous and new orders can be reliably completed in the target setup time.

Preferably, in the slitter-scorer apparatus of the present invention, the control device is configured to: control the width directional movement mechanism such that a width directional movement speed of the corrugated paperboard-processing tool become a maximum speed when the corrugated paperboard-processing tool arrives at an intermediate position corresponding to one-half of the width directional movement distance by which the corrugated paperboard-processing tool is to be moved for the order change; and control the up-down directional movement mechanism such that an up-down directional movement speed of the corrugated paperboard-processing tool become a maximum speed when the corrugated paperboard-processing tool arrives at an intermediate position corresponding to one-half of the up-down directional movement distance by which the corrugated paperboard-processing tool is to be moved for the order change.

According to this feature, with regard to both the width directional movement and the up-down directional movement of the corrugated paperboard-processing tool, the control device adopts a speed profile configured to increase the movement speed of the corrugated paperboard-processing tool (i.e., accelerate the corrugated paperboard-processing tool) until the corrugated paperboard-processing tool arrives at the intermediate position of the distance by which it is to be moved, such that the movement speed becomes a maximum speed at the time when it arrives at the intermediate position, and after arriving at the intermediate position, decelerate the corrugated paperboard-processing tool. In this case, as compared with a speed profile configured to increase the movement speed of the corrugated paperboard-processing tool (i.e., accelerate the corrugated paperboard-processing tool) such that the movement speed reaches a maximum speed just before the intermediate position, and then after maintaining the movement speed at the maximum speed for a certain time, decelerate the corrugated paperboard-processing tool, the magnitude of acceleration/deceleration during the order change can be reduced. Thus, as compared with other speed profiles, the speed profile in the present invention makes it possible to effectively reduce a load imposed on the movement mechanism for the corrugated paperboard-processing tool.

Preferably, in the slitter-scorer apparatus of the present invention, the control device is configured to: calculate a shortest defective length which is equivalent to a distance by which the corrugated paperboard is moved in the feed direction while the corrugated paperboard-processing tool is moved during the order change, when the corrugated paperboard-processing tool is moved in the width direction and the up-down direction with a maximum acceleration/deceleration which can be set for the width directional movement mechanism and the up-down directional movement mechanism, so as to change the position of the corrugated paperboard-processing tool for the order change; when the calculated shortest defective length is less than the given cutoff length, set the target acceleration/deceleration such that the movement of the corrugated paperboard-processing tool during the order change is completed in the target setup time; and when the calculated shortest defective length is equal to or greater than the given cutoff length, set the target acceleration/deceleration to the maximum acceleration/deceleration.

According to this feature, the target acceleration/deceleration can be set to an adequate value depending on a magnitude relationship between the shortest defective length and the cutter cutoff length. In particular, when the calculated shortest defective length is equal to or greater than the cutter cutoff length, the target acceleration/deceleration is set to the maximum acceleration/deceleration, so that the movement of the corrugated paperboard-processing tool during the order change can be completed in the shortest setup time.

Preferably, in the slitter-scorer apparatus of the present invention, the control device is configured to set the target acceleration/deceleration to same values when the corrugated paperboard-processing tool is moved in respective ones of the width direction and the up-down direction, such that the movement of the corrugated paperboard-processing tool for the order change is completed in the target setup time According to this feature, the target acceleration/deceleration for the width directional movement and the target acceleration/deceleration for the up-down directional movement are set to the same values, so that it is possible to simplify processing required for the setting of the target acceleration/deceleration.

Preferably, the control device is configured to adopt, as the given cutoff length, a preliminarily set fixed length.

According to this feature, during the order change, a defective sheet can be appropriately cut off by the cutter, at the preliminarily set fixed length. Such a defective sheet cut off in this manner can be utilized as an underlay board for a stack of non-defective sheets, or the like.

Preferably, the control device is configured to adopt, as the given cutoff length, a length corresponding to a minimum length along the feed direction of a portion of the corrugated paperboard which can be cut off by the cutter depending on the feed speed (limited cutter cutoff length).

According to this feature, during the order change, for example, when the shortest defective length is less than the given cutoff length, a defective sheet can be appropriately cut off by the cutter, at a limited cutter cutoff length depending on the paperboard feed speed.

Preferably, the slitter-scorer apparatus of the present invention further comprises a display unit configured to display the target acceleration/deceleration set by the control device.

According to this feature, an operator can check the target acceleration/deceleration displayed on the display unit.

As above, the slitter-scorer apparatus of the present invention makes it possible to, during an order change, ensure the yield of processed corrugated paperboards to be produced, while suppressing the progression of aging of the movement mechanism for the corrugated paperboard-processing tool.

BRIEF DESCRIPTION OF THE DRAWINGS

FIG. 9 is a block diagram showing an electrical configuration of the slitter-scorer apparatus according to this embodiment.

FIG. 12 illustrates a specific example of a matrix table according to this embodiment.

DETAILED DESCRIPTION OF THE PREFERRED EMBODIMENTS

With reference to the accompanying drawings, a slitter-scorer apparatus according to one embodiment of the present invention will now be described.

<Configuration of Corrugated Paperboard Production Apparatus>

Figure 1:
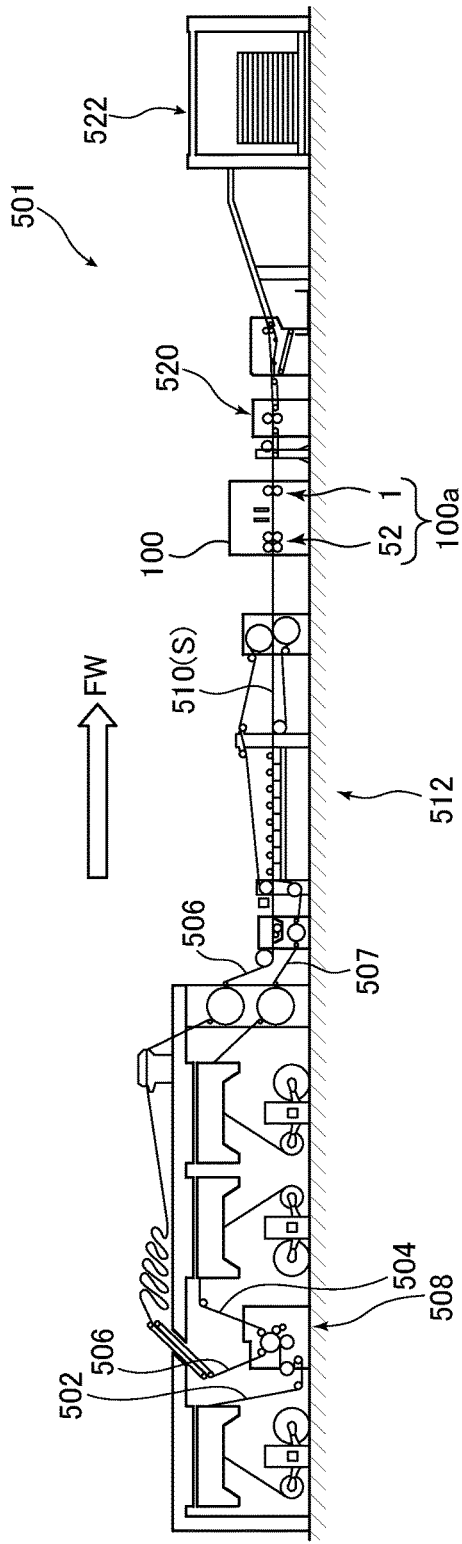
FIG. 1 is a side view showing the overall configuration of a corrugated paperboard production apparatus according to one embodiment of the present invention.

First of all, with reference to FIG. 1, the overall configuration of a corrugated paperboard production apparatus using the slitter-scorer apparatus according to this embodiment will be described. FIG. 1 is a side view showing the overall configuration of the corrugated paperboard production apparatus.

As shown in FIG. 1, the corrugated paperboard production apparatus (corrugator) 501 comprises: a single facer 508 configured to laminate a corrugated medium 502 formed with flutes having a given flue pitch, and a liner 504 together to produce a single-faced corrugated paperboard 506; a double facer 512 configured to laminate another liner 507 to the single-faced corrugated paperboard to produce a double-faced corrugated paperboard 510; a slitter-scorer apparatus 100 comprising a scorer 52 and a slitter 1 (which are equivalent to a corrugated paperboard-processing tool 100a) configured to perform processing of giving score lines to the double-faced corrugated paperboard 510 (scoring) and processing of giving slit lines to the double-faced corrugated paperboard 510 (slitting), respectively, along a feed direction FW of the double-faced corrugated paperboard 510 (i.e., along a direction orthogonal to the flues); a cutter 520 configured to cut the double-faced corrugated paperboard 510 into a given cutoff length in the feed direction FW; and a stacker 522 configured to stack resulting double-faced corrugated paperboards in an up-down direction. The double-faced corrugated paperboard 510 will hereinafter be also referred to simply as "corrugated paperboard S".

<Configuration of Slitter-Scorer Apparatus>

Figure 2:
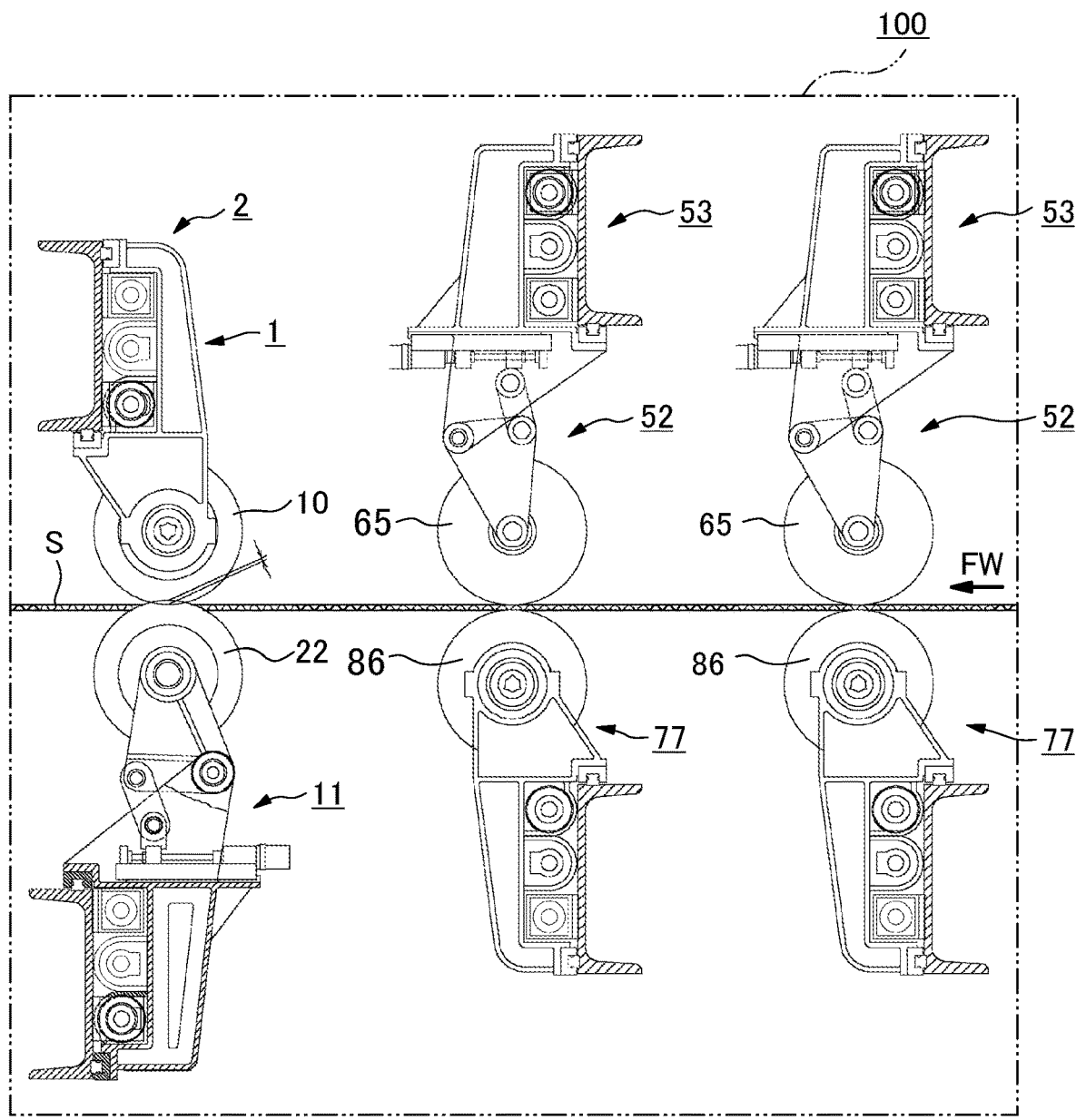
FIG. 2 is a schematic side view showing the slitter-scorer apparatus according to this embodiment.
Figure 3:
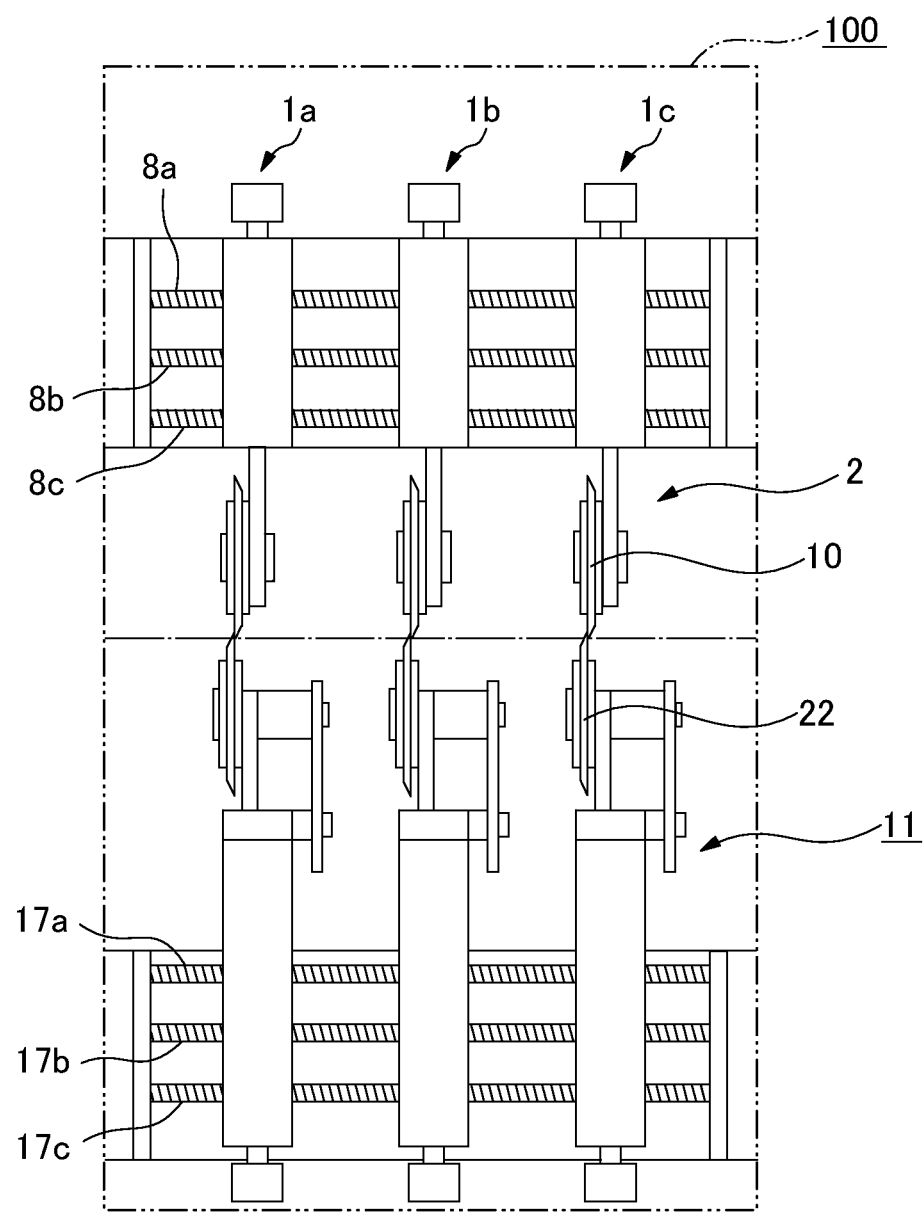
FIG. 3 is a schematic front view showing the entirety of a set of slitters in the slitter-scorer apparatus according to this embodiment.
Figure 4:
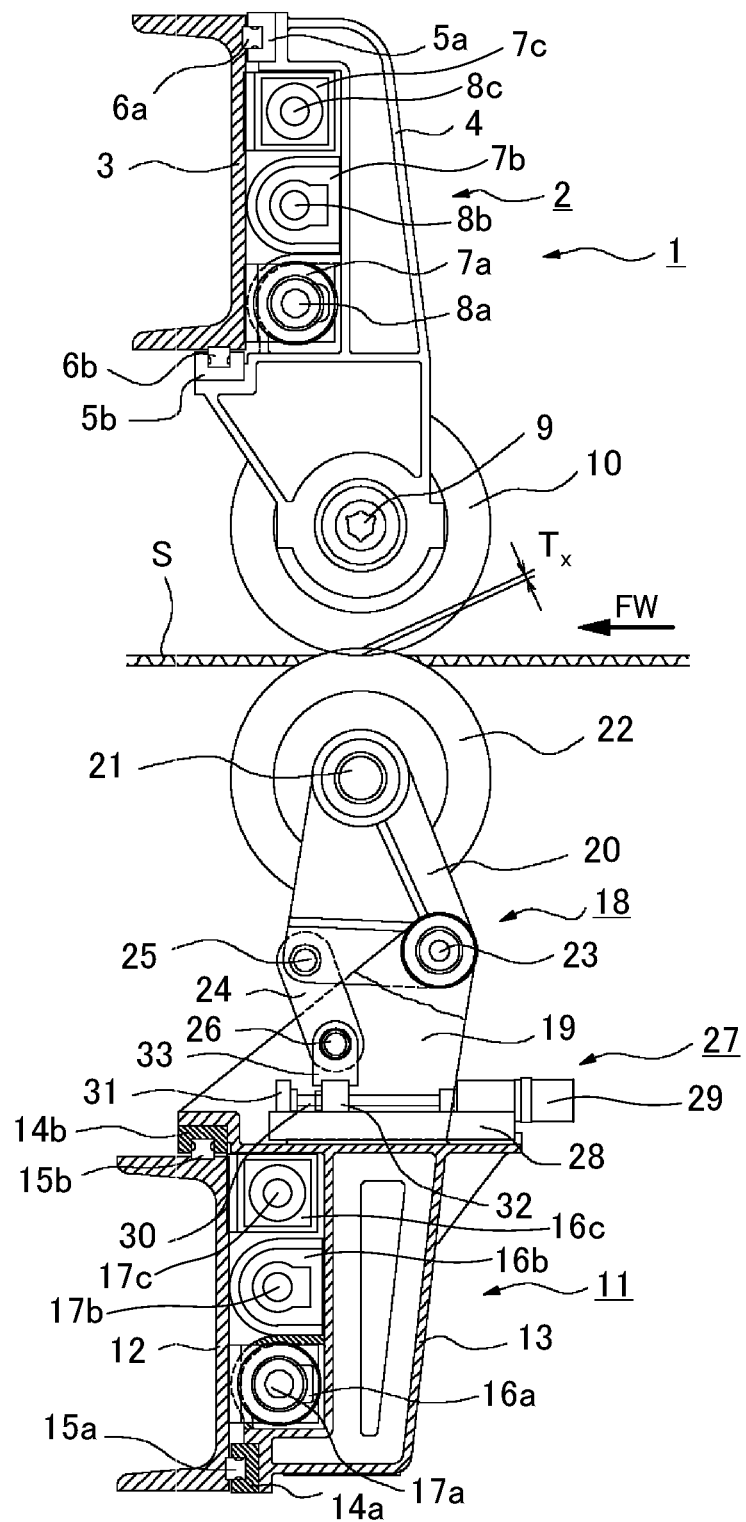
FIG. 4 is a schematic side view showing the slitter in the slitter-scorer apparatus according to this embodiment.
Figure 5:
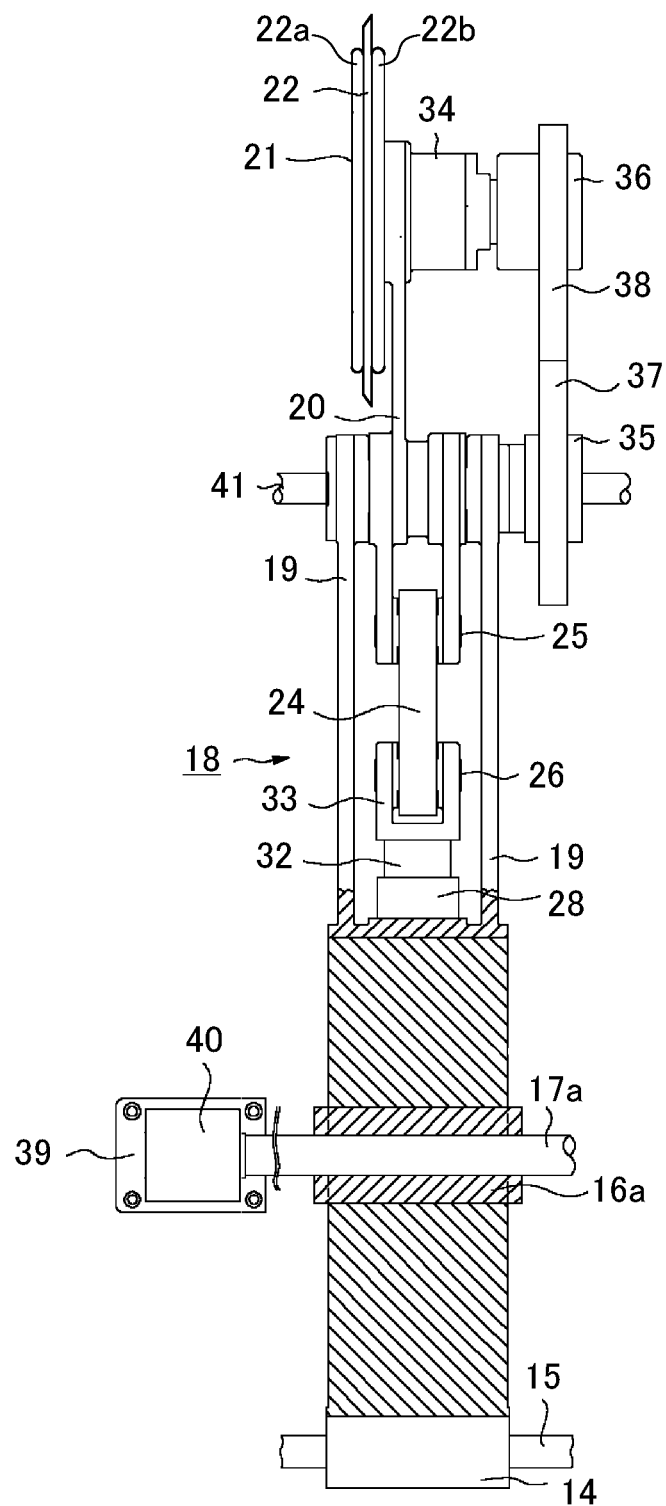
FIG. 5 is a schematic front view showing the slitter in the slitter-scorer apparatus according to this embodiment.
Figure 6:
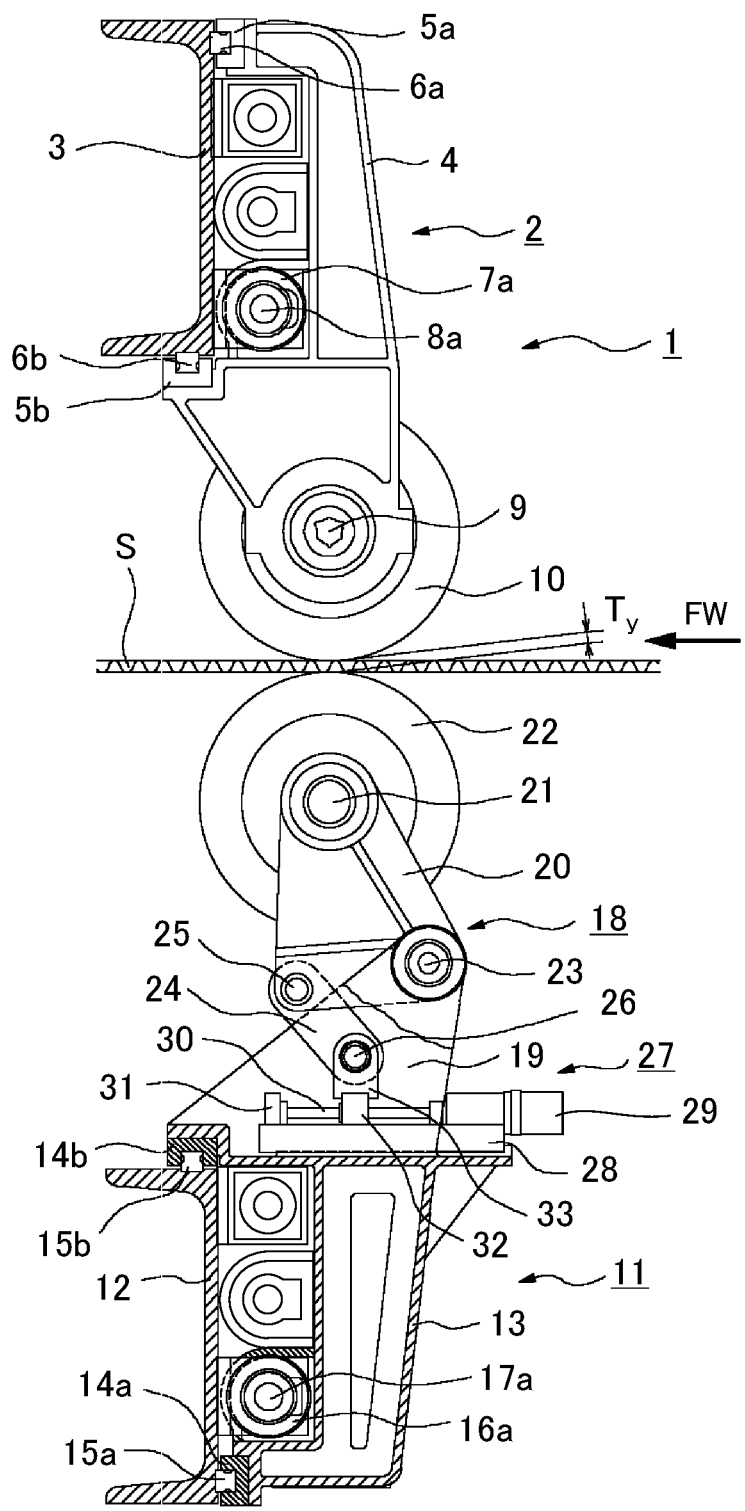
FIG. 6 is a schematic side view showing the slitter in the slitter-scorer apparatus according to this embodiment, wherein the slitter is set at an intermediate position between a processing position and a non-processing position.
Figure 7:
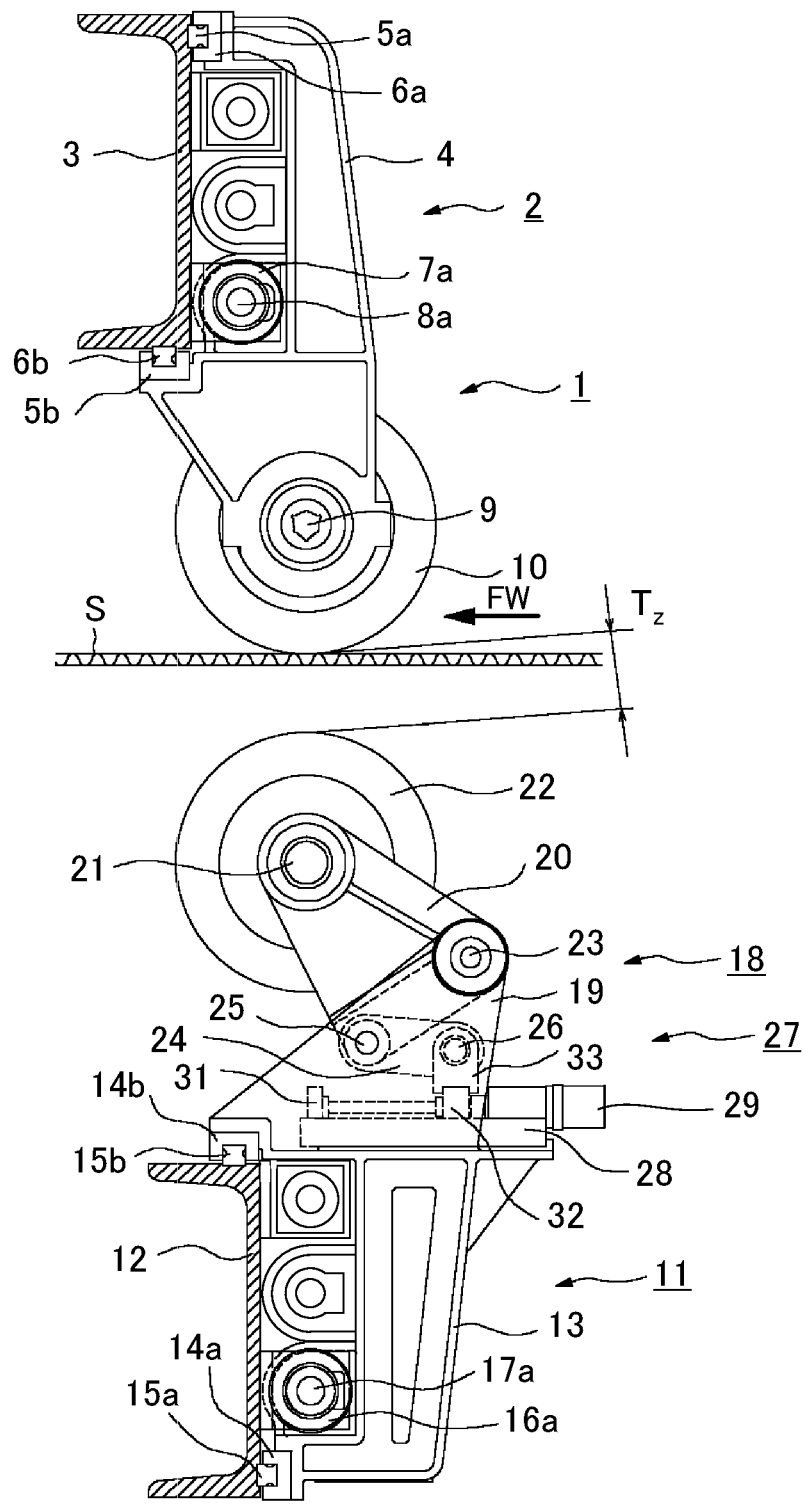
FIG. 7 is a schematic side view showing the slitter in the slitter-scorer apparatus according to this embodiment, wherein the slitter is set at the non-processing position.
Figure 8:
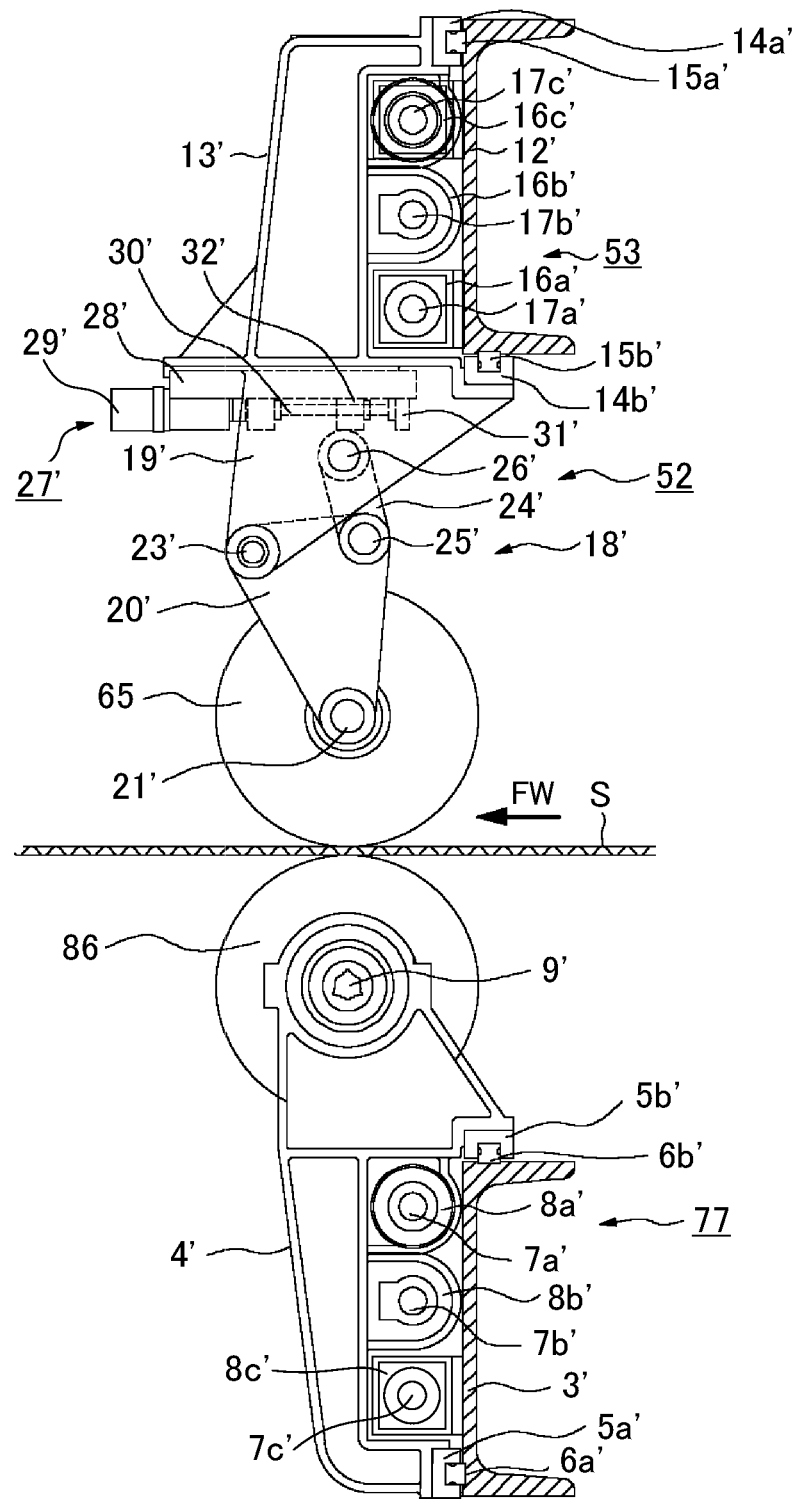
FIG. 8 is a schematic side view showing a scorer in the slitter-scorer apparatus according to this embodiment.

Next, with reference to FIGS. 2 to 8, the slitter-scorer apparatus 100 according to this embodiment will be described in detail. FIG. 2 is a schematic side view showing the slitter-scorer apparatus 100 according to this embodiment. FIG. 3 is a schematic front view showing the entirety of a set of slitters 1 in the slitter-scorer apparatus 100 according to this embodiment, and FIG. 4 and FIG. 5 are, respectively, a schematic side view and a schematic front view showing the slitter 1. FIG. 6 is a schematic side view (corresponding to FIG. 4) showing the slitter 1 which is set at an intermediate position between a processing position and a non-processing position, and FIG. 7 is a schematic side view (corresponding to FIG. 4) showing the slitter 1 which is set at the non-processing position. FIG. 8 is a schematic side view showing a scorer 52 in the slitter-scorer apparatus 100 according to this embodiment.

As shown in FIG. 2, the slitter-scorer apparatus 100 comprises two sets of scorers 52 on the upstream side in the feed direction FW of the corrugated paperboard S (on the upstream side of a feed line), and one set of slitters 1 on the downstream side of the scorers 52. As shown in FIG. 3, the one set of slitters 1 consists of three slitters 1a, 1b, 1c arranged in a width direction, i.e., a direction approximately orthogonal to the feed direction FW of the corrugated paperboard S (when the slitters 1a, 1b, 1c are described without any distinction, each of them will hereinafter be expressed as "slitter 1"). Similarly, each of the two sets of scorers 52 consists of three scorers 52a, 52b, 52c arranged in the width direction (when the scorers 52a, 52b, 52c are described without any distinction, each of them will hereinafter be expressed as "scorer 52"). As discussed later, each of the slitters 1a, 1b, 1c and the scorers 52a, 52b, 52c is configured to be moved independently in the width direction, and positioned in the width direction, in conformity to a change in desired division number or desired division width due to order change. Here, the present invention is not limited to using the set of three slitters 1 and the set of three scorers 52, but may use a set of less than three slitters 1 or scorers 52, or a set of four or more slitters 1 or scorers 52.

As shown in FIG. 4, the slitter 1 comprises an upper slitter 2 and a lower slitter 11 located above and below across a paper line along which the corrugated paperboard S travels, respectively. More specifically, the slitter 1 is a so-called "lower single blade-type slitter" comprising a slitter knife 22 and a slitter receiving member 10 configured to receive the slitter knife 22, located below and above across the paper line, respectively. In another embodiment, it is possible to use a slitter of a type in which each of the upper and lower slitters comprises a slitter knife, or a slitter of a type in which one of the upper and lower slitters comprises a slitter knife, and the other comprises a slitter receiving member.

As shown in FIGS. 4 and 5, in the lower slitter 11, a lower slitter frame 13 is mounted to two guide rails 15a, 15b of a stay 12 bridgingly mounted onto a support frame (not illustrated), through two sliders 14a, 14b. Further, the lower slitter 11 is configured to be positioned at a width directional position corresponding to each production order, by a width directional movement mechanism comprising a bearing 16a mounted to the lower slitter frame 13 and threadingly engaged with a threaded shaft 17a bridged between support frames. In particular, as shown in FIG. 5, in the width directional movement mechanism, the threaded shaft 17a which is configured to be rotated by a width directional movement-inducing servomotor 40 mounted to a support frame for the slitter 1 or the like through a bracket 39 to serve as a drive unit is threadingly engaged with the bearing 16a installed in the lower slitter frame 13 of the lower slitter 11. Thus, when the width directional movement-inducing servomotor 40 is activated to rotate the threaded shaft 17a, the lower slitter 11 is moved on the threaded shaft 17a being rotated, in the width direction through the bearing 16a fixed to the lower slitter frame 13.

The reference signs 17b, 17c in FIG. 4 denote, respectively, two threaded shafts each for width directional movement and positioning of a respective one of the remaining two slitters 1b, 1c arranged side by side in the width direction. The threaded shafts 17b, 17c are configured to move the lower slitters of the slitters 1b, 1c on the threaded shafts 17b, 17c in the width direction through bearings 16b, 16c, respectively.

The lower slitter frame 13 has the slitter knife 22 attached thereto and is provided with an up-down directional movement mechanism configured to move the slitter knife 22 in the up-down direction between a processing position where the corrugated paperboard S is cut, and a non-processing position where the corrugated paperboard S is not cut. Specifically, the up-down directional movement mechanism has a link mechanism 18 comprised of: a first arm 19 fixed to the lower slitter frame 13; a second arm 20 swingably coupled to the first arm 19 through a pivot part 23 located on the after-mentioned drive shaft for rotationally driving the slitter knife, and rotatably coupled to the slitter knife 22 through a rotational support part 21; and a coupling arm 24 coupled to the second arm 20 through a first pivot part 25, and coupled to a swing mechanism 27 through a second pivot part 26. The swing mechanism 27 comprises: an up-down directional movement-inducing servomotor 29 serving as a drive unit; a threaded shaft 30 coupled to the up-down directional movement-inducing servo motor 29; a slide member 32 threadingly engaged with the threaded shaft 30 in such a manner as to be slidable on the threaded shaft 30 along a slide rail 28; a threaded shaft supporting fixed base 31 rotatably supporting the threaded shaft 30 at a position opposed to the up-down directional movement-inducing servomotor 29; and a coupling body 33 attached to the slide member 32 and coupled to the coupling arm 24 through the second pivot part 26.

As above, in the up-down directional movement mechanism, the threaded shaft 30 is rotated by the up-down directional movement-inducing servomotor 29 of the swing mechanism 27, and thus the slide member 32 threadingly engaged with the threaded shaft 30 is slid on the slide rail 28, followed by the coupling arm 24 attached to the slide member 32 through the coupling body 33. As a result, the first pivot part 25 at which the second arm 20 and the coupling arm 24 are engaged with each other is swung about the pivot part 23 of the first arm 19 and the second arm 20, in conjunction with the movement of the coupling arm 24.

More specifically, in FIG. 4, the slitter knife 22 is positioned at the processing position (slitting position), and the slitter knife 22 and the slitter receiving member 10 are engaged ($T_x$) with each other, so that the corrugated paperboard S can be cut. On the other hand, in FIG. 6, the slide member 32 is moved toward the up-down directional movement-inducing servomotor 29 (the right side of the drawing) by the up-down directional movement-inducing servomotor 29, and accordingly the second arm 20 is swung through the coupling arm 24, so that a relatively small gap $T_y$ is formed between the slitter knife 22 and the slitter receiving member 10. At that time, the slitter knife 22 has been swung to a position where it does not interfere with the corrugated paperboard S, and therefore never cuts the corrugated paperboard S. Then, as shown in FIG. 7, the slide member 32 is maximally moved toward the up-down directional movement-inducing servomotor 29 (the right side of the drawing), so that a large gap $T_x$ is formed between the slitter knife 22 and the slitter receiving member 10. A position at that time may be used as the non-processing position of the slitter knife 22. As above, along with the swinging monument of the second arm 20 according to the up-down directional movement mechanism, the slitter knife 22 coupled to the second arm 20 can be reciprocatingly moved in the up-down direction between the processing position where the corrugated paperboard S is cut, and the non-processing position where the corrugated paperboard S is not cut.

As shown in FIG. 5, a rotational drive mechanism for the slitter knife 22 comprises: a slitter knife rotational drive unit (not illustrated) mounted to a support frame or the like; a drive shaft 41 rotatably coupled to the slitter knife rotational drive unit and extending parallel to the threaded shaft 17a; a first driving force transmission member 37 fixed to the drive shaft 41 through a first driving force transmission member-holding body 35; and a second driving force transmission member 38 fixed to an intermediate shaft 34 through a second driving force transmission member-holding body 36 and engaged with the first driving force transmission member 37 to transmit a rotational driving force or torque therebetween. The first arm 19 and the second arm 20 are rotatably supported by the drive shaft 41 through bearings or the like to form the pivot part 23. The slitter knife 22 is configured to be rotated by a torque transmitted from the slitter knife rotational drive unit via the drive shaft 41, the first driving force transmission member 37 and the second driving force transmission member 38, and the first driving force transmission member-holding body 35 is configured to be slid on the drive shaft 41 in the width direction, when the lower slitter 11 is moved along the threaded shaft 17 in the width direction, as mentioned above. Generally, the slitter knife 22 may be rotated at a rotational circumferential speed slightly greater than the feed speed of the corrugated paperboard S, or twice or more the feed speed of the corrugated paperboard S depending on production conditions, etc. This rotational drive mechanism for the slitter knife 22 uses an existing driving force transmission mechanism, but may use any other mechanism as long as it can give a torque to the slitter knife 22. For example, a rotational drive unit or the like may be directly attached onto a shaft center of the rotational support part 21 of the slitter knife 22.

On the other hand, with regard to how to support and how to move in the width direction, the upper slitter 2 is similar to the lower slitter, except that the upper slitter 2 is provided with a slitter receiving member which is not moved between the processing position and the non-processing position, instead of the slitter knife, as described below.

As shown in FIG. 4, in the upper slitter 2, an upper slitter frame 4 is mounted to two guide rails 6a, 6b of a stay 3 bridgingly mounted onto a support frame (not illustrated), through two sliders 5a, 5b. Further, the upper slitter 2 is configured to be positioned at a position corresponding to each production order, by a width directional movement mechanism comprising a bearing 7a mounted to the upper slitter frame 4 and threadingly engaged with a threaded shaft 8a bridged between support frames. The reference signs 8b, 8c in FIG. 4 denote, respectively, two threaded shafts each for width directional movement and positioning of a respective one of the remaining two slitters 1b, 1c arranged side by side in the width direction. The threaded shafts 8b, 8c are configured to move the upper slitters of the slitters 1b, 1c on the threaded shafts 8b, 8c in the width direction through bearings 7b, 7c, respectively.

In the upper slitter frame 4, a slitter receiving member 10 for receiving the slitter knife 22 is rotatably supported at a rotational support part 9. The slitter receiving member 10 acts to receive the slitter knife 22 so as to cut the corrugated paperboard S. Thus, it is desirable to set an up-down directional position of the slitter receiving member 10 with respect to the corrugated paperboard S, such that the slitter receiving member 10 comes into contact with an upper surface of the corrugated paperboard S. In this case, the slitter receiving member 10 may be configured to be positively rotated by a rotational drive mechanism (not illustrated), or to be rotated by a frictional force generated when an outer peripheral surface of the slitter receiving member 10 comes into contact with the corrugated paperboard S being traveling, or to be rotated by a frictional force generated when the slitter knife 22 comes into contact with the slitter receiving member 10.

Alternatively, the slitter receiving member 10 may be composed of a brush shaft rotatably supported by the upper slitter frame 4. In this case, a brush for receiving the slitter knife 22 is implanted into the outer periphery of the brush shaft, such that it is disposed over the entire range within which the lower slitter 11 is moved between support frames in the width direction, whereby a width directional movement mechanism for the upper slitter 2 can be omitted.

Alternatively, the slitter receiving member 10 may be composed of a urethane shaft whose outer periphery is wound by a urethane layer, instead of a brush. In this case, a urethane layer for receiving the slitter knife 22 is wound around the outer periphery of the urethane shaft, such that it is disposed over the entire range within which the lower slitter 11 is moved between the support frames in the width direction, whereby a width directional movement mechanism for the upper slitter 2 can be omitted.

Next, the scorer 52 basically has a similar configuration to that of the slitter 1. Thus, an element or component corresponding to that of the slitter 1 is assigned with the same reference sign, and its detailed description will be omitted. Here, with reference to FIG. 8, only a difference therebetween will be described below.

Firstly, the scorer 52 is different from the slitter 1 in that the slitter 1 is designed to cut the corrugated paperboard S, whereas the scorer 52 is designed to give a score line to the surface of the corrugated paperboard. Thus, as shown in FIG. 2, the scorer 52 comprises a lower scorer 77 and an upper scorer 53 which are provided, respectively, with a lower scoring roll 86 and an upper scoring roll 65, instead of respective ones of the slitter knife 22 of the lower slitter 11 and the slitter receiving member 10 of the upper slitter 2. Secondly, the scorer 52 is different from the slitter 1 in that the slitter 1 uses the up-down directional movement mechanism for moving the slitter knife 22 provided in the lower slitter, between the processing position and the non-processing position in the up-down direction, whereas the scorer 52 uses an up-down directional movement mechanism for moving the upper scoring roll 65 provided in the upper scorer 53, between a processing position where a score line is given and a non-processing position where no score line is given, in the up-down direction.

The upper scoring roll 65 is an active scoring roll, whereas the lower scoring roll 86 is a passive scoring roll. In this regard, the lower scoring roll 86 is placed under the condition that it receives the upper scoring roll 65. Thus, the lower scoring roll 86 is preferably fixed at a position where it holds a lower surface of the corrugated paperboard S, with respect to the paper line of the corrugated paperboard S. The lower scorer 77 does not need to have a swing mechanism for swinging the scoring roll, or the like, as in the upper scorer 53. However, when it is desirable to use a configuration for giving a score line to the corrugated paperboard S from opposite surfaces thereof, two swing mechanisms may be provided in the upper scorer 53 and the lower scorer 77 so as to swing the upper and lower scoring rolls, respectively, thereby creating a score line.

<Electrical Configuration of Slitter-Scorer Apparatus>

Next, with reference to FIG. 9, an electrical configuration of the slitter-scorer apparatus 100 according to this embodiment will be described. As shown in FIG. 9, the slitter-scorer apparatus 100 incorporates a control device 102 to which the up-down directional movement-inducing servomotors 29a, 29b, 29c each provided in a respective one of the slitters 1a, 1b, 1c are connected via up-down directional servo drive units 104a, 104b, 104c, respectively, and the width directional movement-inducing servomotors 40a, 40b, 40c each provided in a respective one of the slitters 1a, 1b, 1c are connected via width directional servo drive units 106a, 106b, 106c, respectively. Position detection means 108 provided in each of the up-down directional movement-inducing and width directional movement-inducing servomotors 29, 40 is connected to a corresponding one of the servo drive units.

Further, a general-purpose operation unit 110 such as a keyboard or a touch-panel disposed on an operation panel of the slitter-scorer apparatus 100, and an upper-level production management device 112 for managing the entire corrugator line of the corrugated paperboard production apparatus 501, are connected to the control device 102. The upper-level production management device 112 operates to manage the single facer 508, the double facer 512, the cutter 520 and the stacker 522, in addition to the slitter-scorer apparatus 100 (see FIG. 1). A rotation pulse generator 114 for detecting the feed speed of the corrugated paperboard S (paperboard feed speed) is also connected to the upper-level production management device 112. This rotation pulse generator 114 is installed, e.g., around a drive motor for the double facer 512.

Although not illustrated, each of an up-down directional movement-inducing servomotor and a width directional movement-inducing servomotor provided in each of the scorers 52a, 52b, 52c is also connected to the control device 102 via a corresponding one of servo drive units. The width directional movement-inducing servomotor 40 and the width directional servo drive unit 106 for the slitter 1, and the width directional movement-inducing servomotor and the width directional servo drive unit for the scorer 52 constitute the "width directional movement mechanism" set forth in the appended claims (the width directional movement mechanism may further comprise the threaded shaft and the bearings). Further, the up-down directional movement-inducing servomotor 29 and the up-down directional servo drive unit 104 for the slitter 1, and the up-down directional movement-inducing servomotor and the up-down directional servo drive unit for the scorer 52 constitute the "up-down directional movement mechanism" set forth in the appended claims (the up-down directional movement mechanism may further comprise the arms, the link mechanism, threaded shaft, the slide member and the coupling body).

The general-purpose operation unit 110 is configured to allow a user or operator to preliminarily input therethrough data such as a processing position (slitting position) of each slitter 1 and a processing position (scoring position) of each scorer 52 corresponding to each order, and the upper-level production management device 112 is configured to issue corresponding instructions, and also give a paperboard feed speed. When an order change occurs in terms of the cutoff length of the corrugated paperboard S, etc., an order change timing, a speed instruction and a position instruction each set based on the paperboard feed speed input from the upper-level production management device 112 is subjected to computational data processing via the control device 102 of the slitter-scorer apparatus 100. Thus, the control device 102 controls to drive the servomotors via the servo drive units, i.e., controls the width directional movement mechanism and the up-down directional movement mechanism of each of the slitters 1 and the scorers 52 to move each of the slitters 1 and the scorers 52 from a processing position of a previous order to a processing position of a new order.

In this embodiment, the upper-level production management device 112 is provided with a storage unit (not illustrated) in which processing position data, non-processing position data and in-movement position data regarding the slitter-scorer apparatus 100, and cutter cutoff length data regarding the cutter 520 are preliminarily stored.

Firstly, the processing position data is data indicative of a position (processing position) at which each of a part or all of the slitters 1 and the scorers 52, which is used for processing in each order, is to be disposed. This processing position data consists of up-down directional position data and width directional position data. A processing position in the up-down direction, indicated by the up-down directional position data, and a processing position in the width direction, indicated by the width directional position data, will hereinafter be referred, respectively, to "up-down directional processing position" and "width directional processing position".

Secondly, the non-processing position data is data indicative of a position (non-processing position) at which each of a part of the slitters 1 and the scorers 52, which is not used for processing in each order, is to be disposed. This non-processing position data consists of the up-down directional position data and the width directional position data. A non-processing position in the up-down direction, indicated by the up-down directional position data, and a non-processing position in the width direction, indicated by the width directional position data, will hereinafter be referred, respectively, to "up-down directional non-processing position" and "width directional non-processing position". It should be noted that the non-processing position data may contain no data indicative of the up-down directional non-processing position.

Thirdly, the in-movement position data is data indicative of an up-down directional position (in-movement position) to be set while each of the slitters 1 and the scorers 52 is moved approximately parallel to the surface of the corrugated paperboard S in the width direction for the purpose of order change (i.e., during the order change). Thus, the in-movement position data consists of the up-down directional position data. Specifically, the in-movement position is an up-down directional position where no processing for the corrugated paperboard S is performed by the slitters 1 and the scorer 52 during the order change. Typically, an up-down directional position depending on the thickness (flute) of corrugated paperboards S being currently produced is adopted as the in-movement position.

Fourthly, the cutter cutoff length data is data regarding a length along the feed direction FW of a portion of the corrugated paperboard S (defective sheet) to be cut off by the cutter 520 so as to remove a defective zone of the corrugated paperboard S that occurred during the order change. It should be noted here that the cutter cutoff length data is not always provided as data indicative of the cutter cutoff length itself. Specifically, as the cutter cutoff length data, either one of a preliminarily-set fixed length, and a limited value of the length of a portion of the corrugated paperboard S which can be cut off by the cutter 520 (limited cutter cutoff length) is stored. For example, an operator manipulates the general-purpose operation unit 110 to adopt either one of the fixed length and the limited cutter cutoff length as the cutter cutoff length data.

More specifically, in a case where a defective zone-including portion of the corrugated paperboard S (defective sheet) is cut off by the cutter 520 at a constant length without depending on the length of the defective part (defective length), the fixed length is set as the cutter cutoff length data. In this case, since the fixed length is set as the cutter cutoff length data, the cutter cutoff length data serves as data indicative of the cutter cutoff length. For example, a defective sheet cut off by the cutter 520 at the fixed length in the above manner can be utilized as an underlay board for non-defective sheets stacked by the stacker 522, or the like. In this example, the fixed length is set based on a length required for an underlay board or the like.

On the other hand, in a case where a defective sheet is cut off by the cutter 520 depending on a defective length (which is, in a typical example, a shortest defective length to be obtained when the corrugated paperboard-processing tool 100a is moved at a maximum acceleration/deceleration during the order change), i.e., in a case where the cutter cutoff length is adjusted depending on the defective length, the limited cutter cutoff length is adopted as the cutter cutoff length data. In this case, when the limited cutter cutoff length is less than the defective length, the defective length is set to the cutter cutoff length, and the cutter 520 will cut the corrugated paperboard S at the defective length (a length derived by adding a margin to the defective length may be set as the cutter cutoff length to cut the corrugated paperboard S). On the other hand, when the limited cutter cutoff length is equal to or greater than the defective length, the cutter 520 cannot cut the corrugated paperboard S at the limited cutter cutoff length. Thus, the limited cutter cutoff length is set to the cutter cutoff length, and the cutter 520 will cut the corrugated paperboard S at the limited cutter cutoff length (a length derived by adding a margin to the limited cutter cutoff length may be set as the cutter cutoff length to cut the corrugated paperboard S). In the former case, the defective length is set as the cutter cutout length, so that the cutter cutoff length data (as which the limited cutter cutoff length is adopted) does not serve as data indicative of the cutter cutoff length. In the latter case, the limited cutter cutoff length is set as the cutter cutout length, so that the cutter cutoff length data serves as data indicative of the cutter cutoff length.

Here, the limited cutter cutoff length has a value depending on the paperboard feed speed. Specifically, the limited cutter cutoff length becomes longer as the paperboard feed speed becomes higher. Preferably, values of the limited cutter cutoff length corresponding to various values of the paperboard feed speeds are preliminarily determined to create a correspondence table between the paperboard feed speed and the limited cutter cutoff length, and the correspondence table is stored in the storage unit of the upper-level production management device 112.

Further, in this embodiment, the control device 102 of the slitter-scorer apparatus 100 is provided with a storage unit (not illustrated) in which a matrix table defining a target acceleration/deceleration with which each of the slitters 1 and the scorers 52 (corrugated paperboard-processing tool 100a) is to be moved during the order change is stored. Although the details will be described later, in this matrix table, with a view to allowing the movement of the corrugated paperboard-processing tool 100a for the order change to be completed in a target setup time, four parameters consisting of the cutter cutoff length, the paperboard feed speed, and a width directional movement distance and an up-down directional movement distance by which the corrugated paperboard-processing tool 100a is to be moved for the order change are associated with the target acceleration/deceleration to be adopted correspondingly to the four parameters. Such a matrix table may be displayed on a display unit such as a touch panel of the general-purpose operation unit 110. This makes it possible for the operator to check the target acceleration/deceleration displayed on the touch panel during inspection of the slitter-scorer apparatus. As a result, the operator finds that the target acceleration/deceleration is set to a relatively small value, and thus can understand that it is possible to obtain an advantageous effect of being able to appropriately suppress the progression of future aging of the movement mechanism for the corrugated paperboard-processing tool 100a.

<Control Method>

Next, a control method of causing the control device 102 of the slitter-scorer apparatus 100 in this embodiment to move the slitters 1 and the scorers 52 (corrugated paperboard-processing tool 100a) in the width direction and the up-down direction during the order change, i.e., a control method for the width directional movement mechanism and the up-down directional movement mechanism (when the two mechanisms are described without any distinction, they will hereinafter be referred to simply as "monument mechanisms"), will be specifically described.

Figure 10A:
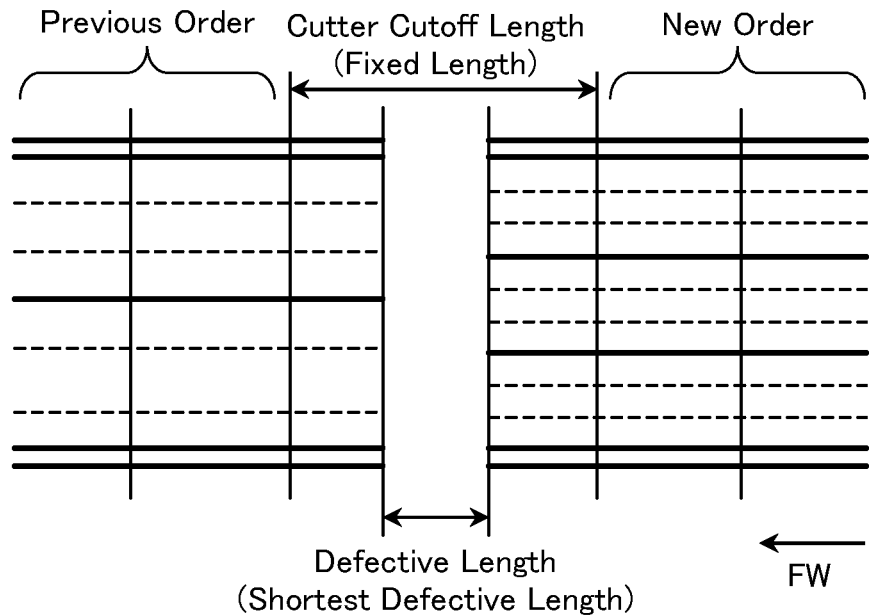
FIGS. 10A and 10B are explanatory diagrams of a basic concept of a control method according to this embodiment.
Figure 10B:
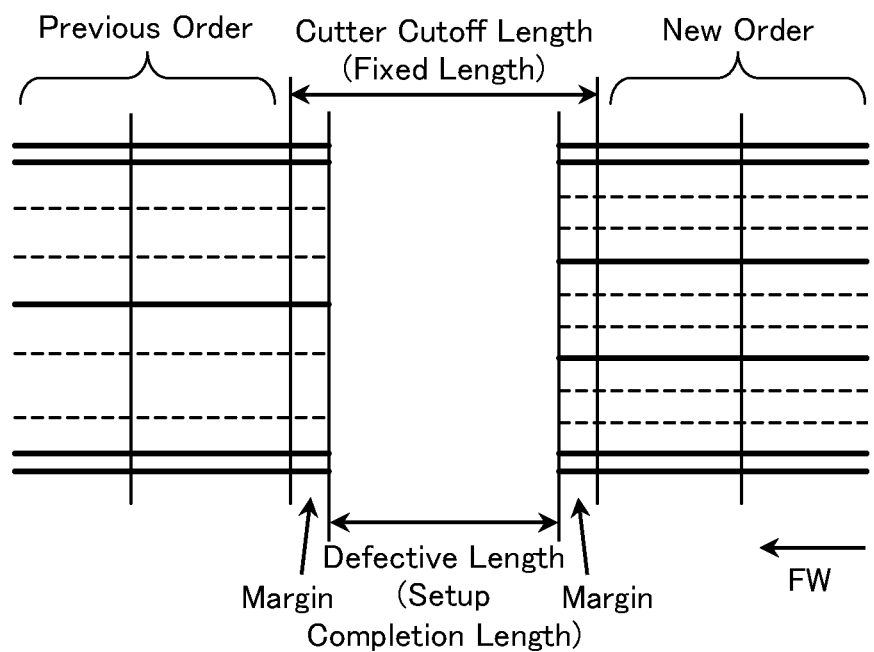

With reference to FIGS. 10A and 10B, a basic concept of the control method according to this embodiment will be described. FIGS. 10A and 10B are top views each showing corrugated paperboards S after passing through the slitter-scorer apparatus 100 and the cutter 520, particularly a state of corrugated paperboards S during the order change. FIG. 10A is an explanatory diagram of a control method in the comparative example, and FIG. 10B is an explanatory diagram of the control method in this embodiment. The following description will be made by taking as an example a case where a portion of the corrugated paperboard S including a defective zone that occurred during the order change (defective sheet) is cutoff by the cutter 520 at the fixed length without depending on the length of the defective zone (defective length) (i.e., a case where the fixed length is adopted as the cutter cutoff length).

As shown in FIG. 10A, in the control method in the comparative example, during the order change, the corrugated paperboard-processing tool 100a is moved with the maximum acceleration/deceleration of the width directional movement mechanism and the up-down directional movement mechanism (specifically, with the maximum acceleration/deceleration determined by performance of the servomotors of the movement mechanism), thereby minimizing the setup time and thus minimizing the defective length. Hereinafter, the setup time and the defective length minimized by moving the corrugated paperboard-processing tool 100a with the maximum acceleration/deceleration will be referred to respectively as "shortest setup time" and "shortest defective length". In the example illustrated in FIG. 10A, the shortest defective length is much shorter than the cutter cutoff length.

When the corrugated paperboard-processing tool 100a is moved with the maximum acceleration/deceleration as in the comparative example, the defective length can be minimized. However, since, not the defective length but the fixed length is adopted as the cutter cutoff length, minimizing the defective length by moving the corrugated paperboard-processing tool 100a with the maximum acceleration/deceleration does not lead to the improvement in yield of processed corrugated paperboards to be produced. This is because since the cutter 520 cuts the corrugated paperboard S at the fixed length, regardless of the defective length (shortest defective length), the length of a defective sheet to be cut off by the cutter 520 is not minimized. If the corrugated paperboard-processing tool 100a is moved with the maximum acceleration/deceleration in a situation where such a movement does not lead to the improvement in yield of processed corrugated paperboards to be produced, an unnecessary load will be imposed on the movement mechanism for the corrugated paperboard-processing tool 100a. This will result in acceleration of aging of the movement mechanism for the corrugated paperboard-processing tool 100a (such as wear of ball screws).

By contrast, in this embodiment, as shown in FIG. 10B, the control device 102 of the slitter-scorer apparatus 100 is operable, during the order change, to move the corrugated paperboard-processing tool 100a with an acceleration/deceleration which allows the defective length to have a value depending on the cutter cutoff length (fixed length), instead of minimizing the setup time and thus minimizing the defective length, i.e., moving the corrugated paperboard-processing tool 100a with the maximum acceleration/deceleration so as to minimize the defective length, as in the comparative example. That is, in this embodiment, the control device 102 is operable to move the corrugated paperboard-processing tool 100a with an acceleration/deceleration which can realize a satiation where a period of time during which a portion of the corrugated paperboard S corresponding to the cutter cutoff length, specifically, a length derived by removing a given margin (leading and trailing ends of a portion to be formed as a defective sheet) from the cutter cutoff length, substantially passes through the slitter-scorer apparatus 100 is consistent with a period of time during which the corrugated paperboard-processing tool 100a is moved for the order change.

Specifically, in this embodiment, the control device 102 sets, based on the cutter cutoff length and the paperboard feed speed, a target setup time necessary to move the corrugated paperboard-processing tool 100a in the width direction and the up-down direction for the order change. In this case, the control device 102 sets, as the target setup time, a time necessary for a portion of the corrugated paperboard S corresponding to the cutter cutoff length, specifically, a length derived by removing a given margin from the cutter cutoff length, to substantially pass through the slitter-scorer apparatus 100. More specifically, the control device 102 sets, as the target setup time, a time derived by subtracting a given margin from the cutter cutoff length, and dividing the obtained difference (hereinafter referred to as "setup completion length", as appropriate) by the paperboard feed speed detected by the rotation pulse generator 114. Then, the control device 102 sets a target acceleration/deceleration such that the movement of the corrugated paperboard-processing tool 100a (width directional movement mechanism and the up-down directional movement mechanism) for the order change is completed in the target setup time, and controls the corrugated paperboard-processing tool 100a, such that it is to be moved with the target acceleration/deceleration during the order change.

Figure 11A:
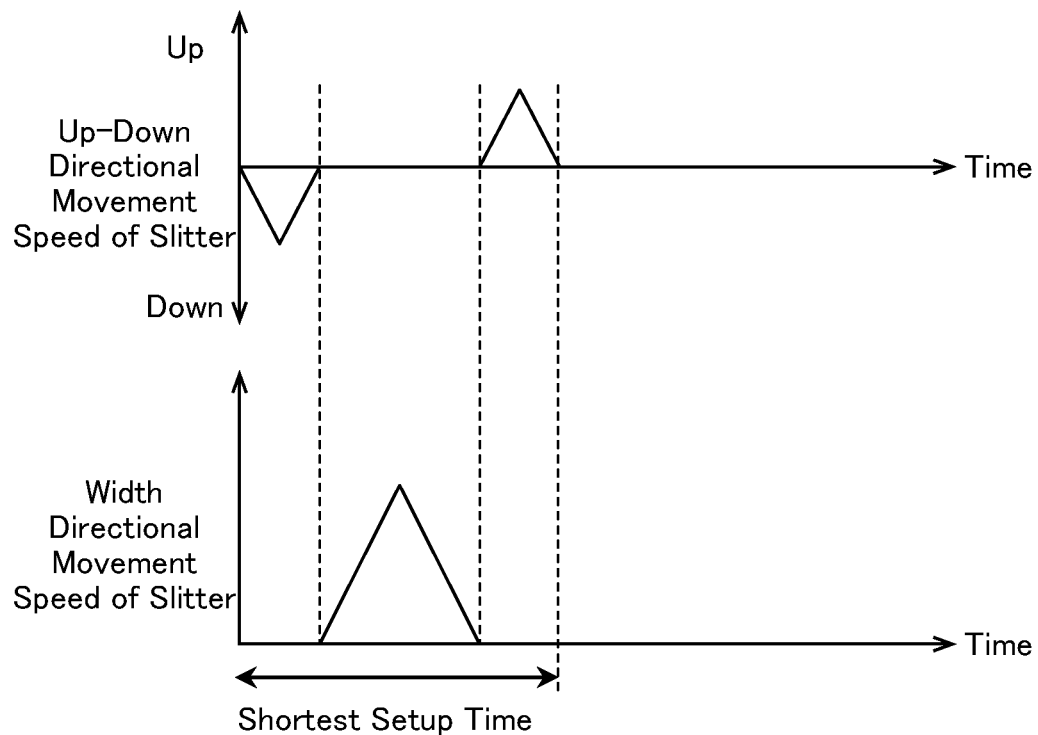
FIGS. 11A and 11B are explanatory diagrams of a target setup time according to this embodiment.
Figure 11B:
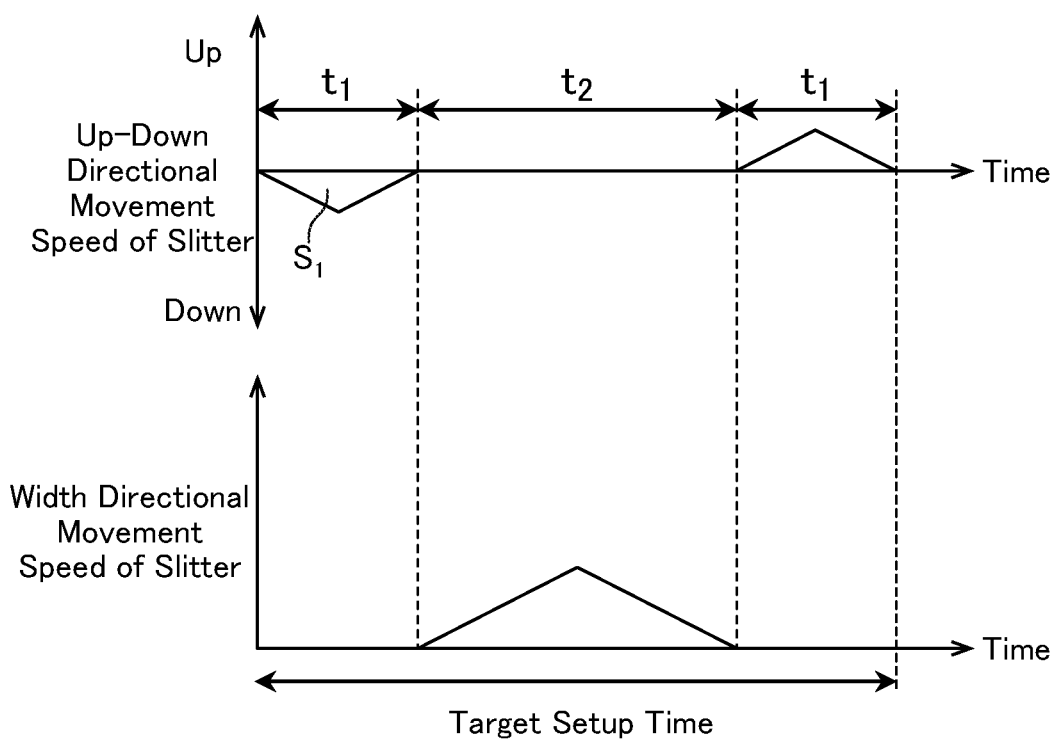

Next, with reference to FIGS. 11A and 11B, the target setup time in this embodiment will be described in more detail. FIGS. 11A and 11B illustrate up-down directional and width directional movement speeds of the slitter 1 during the order change. As with FIGS. 10A and 10B, FIGS. 11A and 11B show the control method in the comparative example and the control method in this embodiment, respectively. Here, assume that during the order change, the slitter 1 is firstly moved in the down direction (moved to the in-movement position in the down direction), and then moved in the width direction (moved to a width directional position for a new order, in the width direction), whereafter the slitter 1 is moved in the up direction (moved from the in-movement position in the up direction). Further, assume that the slitter 1 performs uniformly-accelerated motion and uniformly-decelerated motion during the movement, wherein the magnitudes (absolute valued) of acceleration and deceleration of the slitter 1 in this process are the same. Although FIGS. 11A and 11B show the movement speeds of the slitter 1, the movement speeds of the scorer 52 are similar thereto. Thus, their description will be omitted.

As shown in FIG. 11A, in the comparative example, the setup time is minimized by moving the slitter 1 with the maximum acceleration/deceleration during the order change, i.e., the shortest setup time is realized. By contrast, as shown in FIG. 11B, in this embodiment, the control device 102 sets the target setup time depending on the cutter cutoff length (>the shortest setup time), and operates to move the slitter 1 with the target acceleration/deceleration depending on the target setup time (<the maximum acceleration/deceleration), such that the movement of the slitter 1 is completed in the target setup time.

As above, in this embodiment, instead of minimizing the defective length without depending on the cutter cutoff length, i.e., moving the corrugated paperboard-processing tool 100a with the maximum acceleration/deceleration so as to minimize the defective length, without any exception, as in the comparative example, the corrugated paperboard-processing tool 100a is moved with an acceleration/deceleration smaller than that in the comparative example, such that the defective length is set depending on the cutter cutoff length. Thus, in this embodiment, it becomes possible to reduce a load imposed on the movement mechanism for the corrugated paperboard-processing tool 100a to appropriately suppress the progression of aging of the movement mechanism (wear of ball screws (threaded shafts and the bearings), etc.).

On the other hand, in this embodiment, since the corrugated paperboard S is cut by the cutter 520 at the same cutter cutoff length (fixed length) as that in the comparative example, during the order change, the length of a resulting defective sheet becomes equal to that in the comparative example. Thus, in this embodiment, it becomes possible to appropriately ensure the yield of processed corrugated paperboards to be produced.

Here, in this embodiment, the control device 102 refers to a matrix table preliminarily stored in the storage unit and sets the target acceleration/deceleration to be adopted during the order change, as mentioned above. In this matrix table, with a view to allowing the movement of the corrugated paperboard-processing tool 100a for the order change to be completed in the target setup time, four parameters consisting of the cutter cutoff length, the paperboard feed speed, and a width directional movement distance and an up-down directional movement distance by which the corrugated paperboard-processing tool 100a is to be moved for the order change are associated with the target acceleration/deceleration to be adopted correspondingly to the four parameters. A method of creating this matrix table will be described below. Here, although the matrix table creating method will be described by taking the slitter 1 as an example of the corrugated paperboard-processing tool 100a, a matrix table for the scorer 52 is created in a similar manner. Thus, description about the matrix table for the scorer 52 will be omitted.

First of all, when the paperboard feed speed, the cutter cutoff length, and the margin are represented as $V_L$ (m/s), L (m) and d (m), the setup completion length is expressed as "L−2d" (see FIG. 10B), and thus the target setup time $T_t$ is expressed as the formula (1). The target setup time $T_t$ is equivalent to a time necessary for a portion of the corrugated paperboard S corresponding to the setup completion length (i.e., a length derived by removing margins the reading-side and trailing-side margins from the cutter cutoff length) to substantially pass through the slitter-scorer apparatus 100.

$$T_t=(L-2d)/V_L \quad (1)$$

Then, as shown in FIG. 11B, assume that during the order change, the slitter 1 is firstly moved in the down direction, and then moved in the width direction, whereafter the slitter 1 is moved in the up direction. In this case, when each of the down directional movement time and the up directional movement time of the slitter 1 is represented as $t_1$ (s), and the width directional movement time of the slitter 1 is represented as $t_2$ (s) (FIG. 11B), an actual setup time $T_r$ is expressed as the formula (2).

$$Tr=2t1+t2 \quad (2)$$

In this embodiment, the target acceleration/deceleration is set using a condition $(T_r=T_t)$ that the actual setup time $T_r$ is equal to the target setup time $T_t$, i.e., using a condition expressed as the formula (3).

$$(L-2d)/VL=2t1+t2 \quad (3)$$

Then, a step corresponding to the movement time $t_1$ (s) for which the slitter 1 is moved in the down direction, i.e., a step of moving the slitter 1 from the up-down directional processing position to the in-movement position beneath the up-down directional processing position will be discussed. In this embodiment, the control device 102 controls the up-down directional movement mechanism to acceleratingly move the slitter 1 from the up-down directional processing position to an intermediate position between the up-down directional processing position and the in-movement position, and then deceleratingly move the slitter 1 from the intermediate position to the in-movement position. That is, the control device 102 controls the up-down directional movement mechanism such that when the slitter 1 arrives at the intermediate position between the up-down directional processing position and the in-movement position, the up-down directional movement speed of the slitter 1 becomes a maximum speed. In this case, when an acceleration from the up-down directional processing position to the intermediate position and a deceleration from the intermediate position to the in-movement position are set to the same values a (m/s²) in absolute value, a time necessary for the slitter 1 to move from the up-down directional processing position to the in-movement position is $t_1/2$ (s). The movement speed (maximum speed) $V_1$ (m/s) of the slitter 1 at the time when it arrives at the intermediate position is expressed as the formula (4).

$$V1=\alpha \times t1/2 \quad (4)$$

On the other hand, when a distance from the up-down directional processing position to the in-movement position (i.e., the up-down directional movement distance by which the slitter 1 is to be moved for the order change) is represented as Y (m), the up-down directional movement distance Y (m) is equivalent to an area Si of a triangle illustrated in FIG. 11B, and thus expressed as the formula (5). Here, as the up-down directional movement distance Y, it is possible to adopt a distance depending on the thickness (flute height) of a thicker one of two types of corrugated paperboards S used before and after the order change. For example, a distance derived by adding 3 to 5 mm to the thickness of the thicker corrugated paperboard S is adopted as the up-down directional movement distance Y.

$$Y=V1\times t1/2 \quad (5)$$

By deforming the formula (5), the movement speed $V_1$ of the slitter 1 at the time when it arrives at the intermediate position is expressed as the formula (6).

$$V1=2Y/t1 \quad (6)$$

When the movement speed $V_1$ is eliminated by the formulas (4) and (6), the formula (7) is obtained $$\alpha \times t1/2=2Y/t1 \quad (7)$$

When the formula (7) is organized, the down directional movement time $t_1$ (s) of the slitter 1 is expressed as the formula (8). It is to be understood that the up directional movement time $t_1$ (s) of the slitter 1 is the same.

$$t_1=2\sqrt{Y}/\sqrt{\alpha} \quad (8)$$

Next, a step corresponding to the movement time $t_2$ (s) for which the slitter 1 is moved in the width direction, i.e., a step of moving the slitter 1 from the width directional position for the precious order to the width directional position for the new order will be discussed. In this embodiment, the control device 102 controls the width directional movement mechanism to acceleratingly move the slitter 1 from the width directional processing position for the previous order to an intermediate position between the width directional position for the previous order and the width directional position for the new order, and then deceleratingly move the slitter 1 from the intermediate position to the width directional position for the new order. That is, the control device 102 controls the width directional movement mechanism such that when the slitter 1 arrives at the intermediate position between the width directional position for the previous order and the width directional position for the new order, the width directional movement speed of the slitter 1 becomes a maximum speed. In this case, an acceleration from the width directional position for the previous order to the intermediate position and a deceleration from the intermediate position to the width directional position for the new order are set to the same values a (m/s²) in absolute value. Here, assume that the acceleration/deceleration during the width directional movement and the acceleration/deceleration during the up-down directional movement are set to the same values a. Further, a distance from the width directional position for the previous order to the width directional position for the new order (i.e., the width directional movement distance by which the slitter 1 is to be moved for the order change) is represented as X (m). Thus, through a similar deriving process to that for the formula (8), the width directional movement time $t_2$ (s) of the slitter 1 is expressed as the formula (9).

$$t_2 = 2\sqrt{X}/\sqrt{\alpha} \tag{9}$$

Here, as the width directional movement distance X, it is possible to adopt a greatest one of a plurality of width directional movement distances by which the plurality of slitters are to be moved during the order change, respectively, Then, when the formulas (8) and (9) are assigned to the conditional formula (3), the conditional formula (3) is expressed as the formula (10).

$$\begin{aligned}(L-2d)/VL &= 2 \times 2\sqrt{Y}/\sqrt{\alpha}1 + 2\sqrt{X}/\sqrt{\alpha} \\ &= 2(2\sqrt{Y}+\sqrt{X})/\sqrt{\alpha}\end{aligned} \tag{10}$$

When the formula (10) is solved for a, the target acceleration/deceleration $\alpha$ to be set to allow the movement of the width directional and up-down directional movements of the slitter 1 for the order change to be completed in the target setup time $T_t$ is expressed as the formula (11). As shown in the formula (11), the target acceleration/deceleration $\alpha$ is defined by the cutter cutoff length L, the paperboard feed speed $V_L$, the width directional movement distance X and the up-down directional movement distance Y.

$$\alpha = 4V_L^2(2\sqrt{Y}+\sqrt{X})^2/(L-2d)^2 \tag{11}$$

In one example, when the cutter cutoff length L, the paperboard feed speed $V_L$, the margin d, the width directional movement distance X and the up-down directional movement distance Y are, respectively, 800 (mm), 200 (m/s), 25 (mm), 100 (mm) and 16 (mm), the target acceleration/deceleration $\alpha$ is obtained as 25.6 (m/s$^2$) from the formula (11). Thus, by preliminarily determining the target acceleration/deceleration $\alpha$ for various combinations of the cutter cutoff length L, the paperboard feed speed $V_L$, the width directional movement distance X and the up-down directional movement distance Y, a matrix table defining the target acceleration/deceleration $\alpha$ to be set correspondingly to the four parameters consisting of the cutter cutoff length L, the paperboard feed speed $V_L$, the width directional movement distance X and the up-down directional movement distance Y is created. The matrix table defining the target acceleration/deceleration $\alpha$ of the scorer 52 is also created in a similar manner.

FIG. 12 illustrates a specific example of the matrix table in this embodiment. This matrix table defines the target acceleration/deceleration $\alpha$ to be set depending on various combinations of the paperboard feed speed $V_L$ and the width directional movement distance X in a case where the cutter cutoff length L is 800 (mm), and the up-down directional movement distance Y for producing corrugated paperboards S whose flute type is AB flute (thickness: 8 (mm)) is adopted. According to this matrix table, for example, when the paperboard feed speed $V_L$ is 0 to 125 (m/s), and the width directional movement distance X is 0 to 25 (mm), the target acceleration/deceleration $\alpha$ of the slitter 1 is set to 5.2 (m/s$_2$).

The matrix table in FIG. 12 defines the target acceleration/deceleration $\alpha$ to be set for combinations of a plurality of ranges of the paperboard feed speed $V_L$ each having a certain width and a plurality of ranges of the width directional movement distance X each having a certain width. Actually, the target acceleration/deceleration $\alpha$ defined for each range in the matrix table is set based on an upper limit (maximum value) defining each range of the paperboard feed speed $V_L$, and an upper limit (maximum value) defining each range of the width directional movement distance X. For example, with regard to a combination of a range of the paperboard feed speed $V_L$ from 176 to 200 (m/s) and a range of the width directional movement distance X from 76 to 100 (mm), a value (25.6 (m/s$^2$) of the target acceleration/deceleration $\alpha$ to be set is obtained based on 200 (m/s) as an upper value of the range of the paperboard feed speed $V_L$ and 100 (mm) as an upper value of the range of the width directional movement distance X. This is because since, as expressed as the formula (11), as the paperboard feed speed $V_L$ becomes higher or each of the movement distances X, Y becomes longer, the target acceleration/deceleration $\alpha$ becomes greater, and thus the slitter 1 needs to be moved more quickly, it is desirable to define the target acceleration/deceleration $\alpha$ based on conditions required for the slitter 1 to be moved most quickly (i.e., an upper limit (maximum value) defining the range of the paperboard feed speed $V_L$ and an upper limit (maximum value) defining the range of the width directional movement distance X).

It should be noted here that the present invention is not limited to setting the target acceleration/deceleration $\alpha$ from the matrix table. In another example, the target acceleration/deceleration $\alpha$ may be set by calculating the formula (11) every order change without using the matrix table. However, when the target acceleration/deceleration $\alpha$ is set from the matrix table, control processing during the order change is not complicated, so that it is possible to more reliably suppress the occurrence of operating delay, etc., as compared with the case where the target acceleration/deceleration $\alpha$ is set by calculating the formula (11). For this reason, setting the target acceleration/deceleration $\alpha$ from the matrix table can be said to be more desirable than setting the target acceleration/deceleration $\alpha$ by calculating the formula (11).

Figure 13:
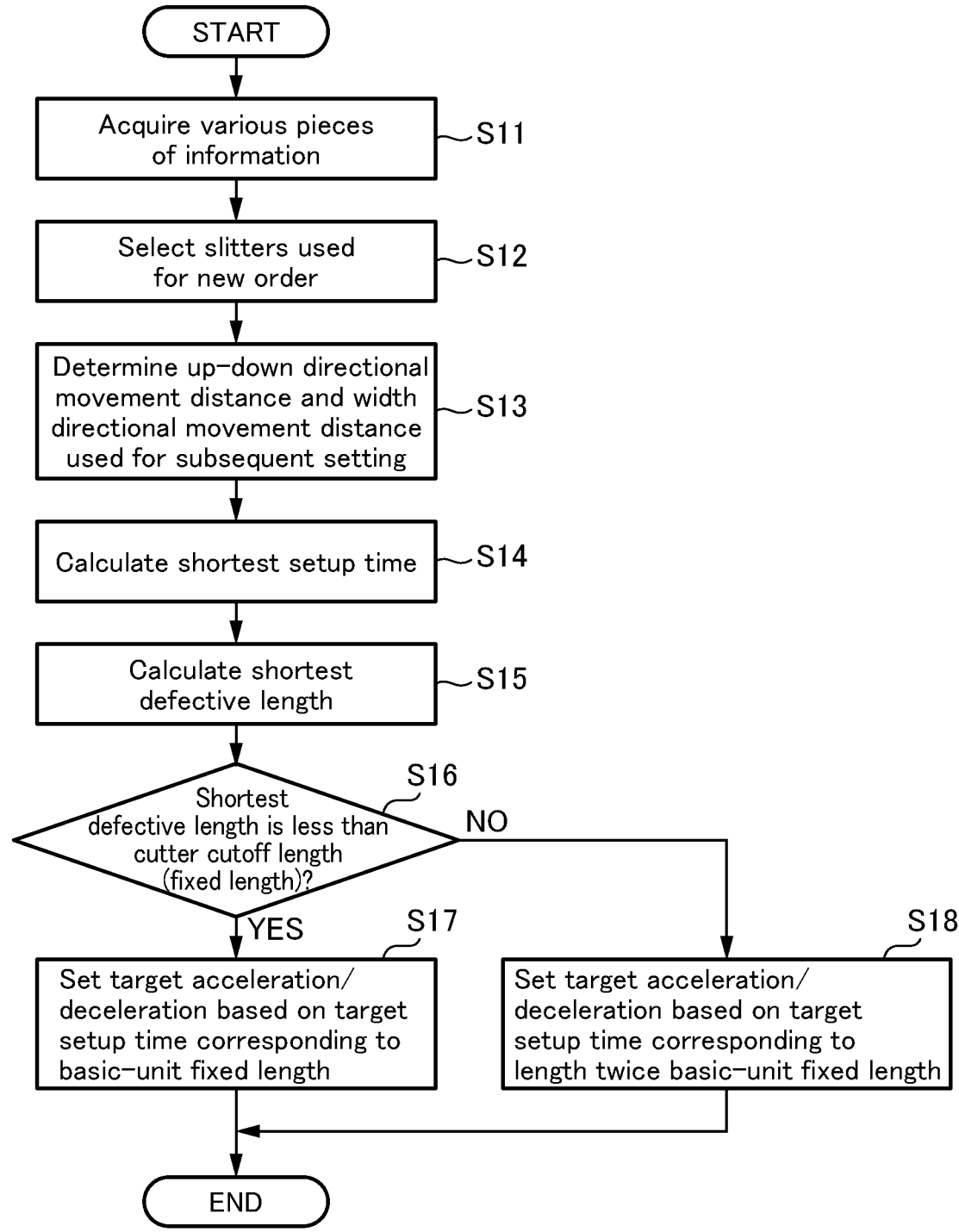
FIG. 13 is a flowchart showing a target acceleration/deceleration setting processing for the slitter, according to this embodiment.

Next, with reference to FIG. 13, a target acceleration/deceleration setting processing for the slitter 1 in this embodiment will be described. FIG. 13 is a flowchart showing the target acceleration/deceleration setting processing for the slitter 1 in this embodiment. This target acceleration/deceleration setting processing is executed by the control device 102 of the slitter-scorer apparatus 100, during production for the previous order, prior to performing the order change for processed corrugated paperboards S to be produced. Here, although the target acceleration/deceleration setting processing will be described by taking the slitter 1 as an example of the corrugated paperboard-processing tool 100a, a target acceleration/deceleration setting processing for the scorer 52 is also performed in a similar manner. Thus, description about the processing for the scorer 52 will be omitted.

First of all, in step S11, the control device 102 acquires various pieces of information from the upper-level production management device 112. Specifically, the control device 102 acquires at least: the processing position data, the non-processing position data and the in-movement position data regarding the slitter-scorer apparatus 100; the cutter cutoff length data regarding the cutter 520; and the paperboard feed speed $V_L$ detected by the rotation pulse generator 114.

Then, in step S12, the control device 102 selects two or more slitters to be used for a new order, from among the set of slitters 1. Specifically, the control device 102 selects two or more slitters to be used for a new order, among the set of slitters 1, based on the processing position data for the previous order, the processing position data for the new order, etc., such that the movement distance (particularly, width directional movement distance) from the processing position of each of the selected slitters for the previous order to a specific one of two or more processing positions for the new order is the shortest among the set of slitters 1.

Then, in step S13, the control device 102 determines the up-down directional movement distance Y and the width directional movement distance X of each slitter 1 to be used for subsequent setting, etc. That is, the control device 102 determines the up-down directional movement distance Y and the width directional movement distance X by which the slitter 1 is to be moved for the order change. Specifically, the control device 102 adopts, as the up-down directional movement distance Y, a distance from the up-down directional processing position to the in-movement position. Typically, the control device 102 will adopt, as the up-down directional movement distance Y, a distance depending on a thickness (flute height) of a thicker one of two types of corrugated paperboards S used before and after the order change. Further, the control device 102 determines a distance from the width directional position for the previous order to the width directional position for the new order, with respect to each of the set of slitters 1, and adopts, as the width directional movement distance X, a maximum one of the determined distances for all the set of slitters 1.

Then, in step S14, the control device 102 calculates a setup time (shortest setup time $T_{min}$) to be measured when the slitter 1 is moved by the up-down directional movement distance Y and the width directional movement distance X determined in the step S13, with the maximum acceleration/deceleration $\alpha_{max}$. Here, assume that an acceleration/deceleration during the up-down directional movement of the slitter 1 for the order change is equal to an acceleration/deceleration during the width directional movement of the slitter 1 for the order change. In this case, from the aforementioned formulas (2), (8) and (9), the shortest setup time $T_{min}$ is expressed as the formula (12).

$$T\min = 2(2\sqrt{Y}+\sqrt{X})/\sqrt{\alpha_{max}} \qquad (12)$$

Then, in step S15, the control device 102 calculates the length of a defective zone occurring when the slitter 1 is moved with the maximum acceleration/deceleration $\alpha_{max}$ for the order change (shortest defective length), by multiplying the paperboard feed speed $V_L$ by the shortest setup time $T_{min}$ determined in the step S14.

Then, in step S16, the control device 102 compares the shortest defective length determined in the step S15 with the length of a portion of the corrugated paperboard S (defective sheet) to be cutoff by the cutter 520 so as to remove the defective zone of the corrugated paperboard S which occurred during the order change (cutter cutoff length). In this case, the control device 102 adopts a preliminarily-set fixed length as the cutter cutoff length. Specifically, the control device 102 adopts, as a basic-unit fixed length, a predefined length of a reference defective sheet to be cut off by the cutter 520. Particularly in the step S16, the control device 102 determines whether or not the shortest defective length is less than a basic-unit fixed length. Generally, the shortest defective length falls within the basic-unit fixed length (the length of a defective sheet with the basic-unit fixed length), or a length twice the basic-unit fixed length (the length of a defective sheet with length twice the basic-unit fixed length).

As a result of the determination in the step S16, when the shortest defective length is determined to be less than the basic-unit fixed length (step S 16: YES), the control device 102 proceeds to step S17. In the step S17, the control device 102 sets the target acceleration/deceleration $\alpha$ of the slitter 1 which is capable of realizing the target setup time $T_t$ corresponding to the basic-unit fixed length (the target setup time $T_t$ is derived from the cutter cutoff length L equal to the basic-unit fixed length, and a current value of the paperboard feed speed $V_L$, using the formula (1)). Specifically, the control device 102 refers to the matrix table stored in the storage unit to read out the target acceleration/deceleration $\alpha$ to be adopted correspondingly to the cutter cutoff length L equal to the basic-unit fixed length, the paperboard feed speed $V_L$ acquired in the step S11, and the up-down directional movement distance Y and the width directional movement distance X each determined in the step S13, and sets the read target acceleration/deceleration $\alpha$. In this case, the cutter 520 will cut off a defective sheet with the basic-unit fixed length.

On the other hand, when the shortest defective length is determined to be equal to or greater than the basic-unit fixed length (step S16: NO), the control device 102 proceeds to step S18. In the step S18, the control device 102 sets the target acceleration/deceleration $\alpha$ of the slitter 1 which is capable of realizing the target setup time $T_t$ corresponding to a length twice the basic-unit fixed length (the target setup time $T_t$ is derived from the cutter cutoff length L equal to the length twice the basic-unit fixed length, and a current value of the paperboard feed speed $V_L$, using the formula (1)). Specifically, the control device 102 refers to the matrix table stored in the storage unit to read out the target acceleration/deceleration $\alpha$ to be adopted correspondingly to the cutter cutoff length L twice the basic-unit fixed length, the paperboard feed speed $V_L$ acquired in the step S11, and the up-down directional movement distance Y and the width directional movement distance X each determined in the step S13, and sets the read target acceleration/deceleration $\alpha$. In this case, the cutter 520 will cut off a defective sheet with the length twice the basic-unit fixed length.

The acceleration/deceleration $\alpha$ set in the above manner is applied to all the set of slitters 1 during the order change.

In this embodiment, in the steps S17 and S18, a uniform acceleration/deceleration $\alpha$ is set correspondingly to the maximum width directional movement distance determined in the step S13, i.e., a greatest one of a plurality of the width directional movement distances determined for the set of slitters 1, and the set acceleration/deceleration $\alpha$ is applied to all the set of slitters 1. However, the present invention is not limited thereto. For example, in the steps S17 and S18, a plurality of target accelerations/decelerations a may be set correspondingly to respective width directional movement distances of the slitters 1 determined in the step S13, and each of the set target accelerations/decelerations may be applied to a corresponding one of the slitters 1. In this case, the target accelerations/deceleration $\alpha$ to be set for the slitter 1 having a relatively small width directional movement distance is reduced, so that it becomes possible to more effectively suppress the progression of aging of the movement mechanism.

Further, there is a situation where when a similar setting processing for the target accelerations/deceleration is performed for the scorer 52, the result of the determination in the step S16 becomes different from that for the slitter 1. For example, there is a situation where the shortest defective length for the slitter 1 is determined to be equal to or greater than the basic-unit fixed length (step S16: NO; thus, the process proceeds to the step S18), whereas the shortest defective length for the scorer 52 is determined to be less than the basic-unit fixed length (step S16: YES; thus, the process proceeds to the step S17). This situation occurs when the width directional movement distance X to be adopted in the step S13 is largely different between the slitter 1 and the score 52. In this situation, the cutter 520 will cut off a defective sheet with the length twice the basic-unit fixed length. Therefore, for the scorer 52, the process may be controlled to proceed from the step S16 to the step S18 (instead of the step S17), and the target acceleration/deceleration α may be based on the target setup time corresponding to the length twice the basic-unit fixed length. In this case, the target accelerations/deceleration α to be set for the scorer 52 is reduced, so that it becomes possible to more effectively suppress the progression of aging of the movement mechanism.

Figure 14:
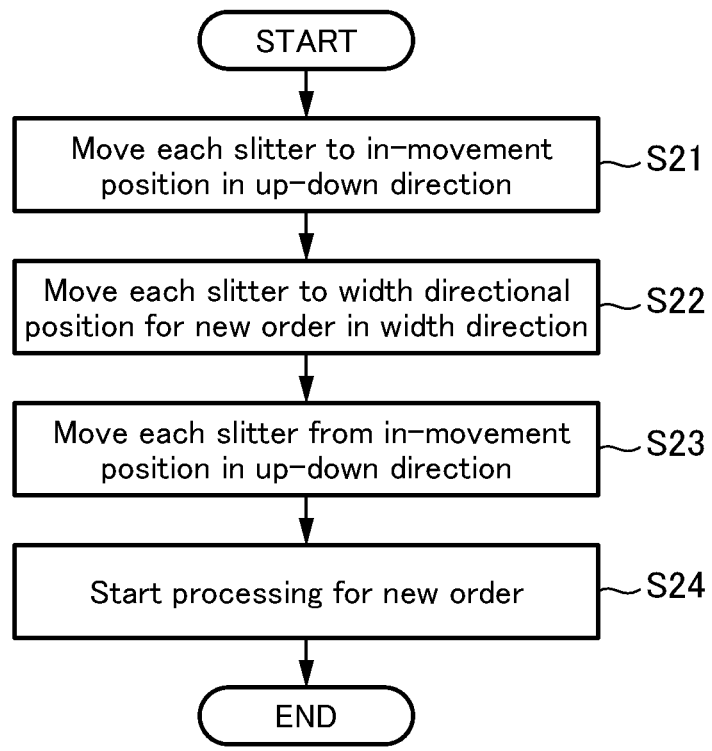
FIG. 14 is a flowchart showing a slitter setup processing according to this embodiment.

Next, with reference to FIG. 14, setup processing for the slitters 1 in this embodiment will be described. FIG. 14 is a flowchart showing the setup processing for the slitters 1 in this embodiment. This setup processing is executed by the control device 102 of the slitter-scorer apparatus 100, during the order change, particularly, after the setting processing for the target acceleration/deceleration in FIG. 13. For example, the setup processing is started at the time when a request for an order change is input from the upper-level production management device 112 to the control device 102 of the slitter-scorer apparatus 100. Here, although the setup processing will be described by taking the slitters 1 as an example of the corrugated paperboard-processing tool 100a, setup processing for the scorers 52 is performed in a similar manner. Thus, description about the setup processing for the scorers 52 will be omitted.

First of all, in step S21, the control device 102 controls the up-down directional movement mechanism to move each slitter 1 to the in-movement position in the up-down direction with the target acceleration/deceleration α set by the processing in FIG. 13. Specifically, the control device operates to move all the set of slitters 1 to the in-movement position by moving two or more of the set of slitters which have been used in processing for the precious order, in the down direction, i.e., from an up-down directional processing position for the previous order to the in-movement position in the down direction, and moving the remaining slitter(s) 1 which has (have) not been used in processing for the precious order, from an up-down directional non-processing position for the previous order to the in-movement position in the up direction. This is because the in-movement position is located below the up-down directional processing position, and above the up-down directional non-processing position. In this case, the control device 102 controls the up-down directional movement-inducing servomotors 29 via the up-down directional servo drive units 104, thereby moving the slitters 1 to the in-movement position in the up-down direction. Here, instead of moving the slitter(s) 1 which has (have) not been used in processing for the precious order, from the up-down directional non-processing position to the in-movement position in the up direction, as in the above example, the slitter(s) 1 which has (have) not been used in processing for the precious order may be kept at the up-down directional non-processing position, without being moved.

Then, in step S22, the control device 102 controls the width directional movement mechanism to move each slitter 1 from a width directional position for the previous order to a width directional position for the new order in the width direction with the target acceleration/deceleration α set by the processing in FIG. 13. Specifically, the controller 102 operates to move two or more of the set of slitters 1 which will be used in processing for the new order, from a current width directional position to a width directional position for the new order, and move the remaining slitter(s) 1 which will not be used in processing for the new order, from a current width directional position to a width directional non-processing position for the new order. In this case, the control device 102 controls the width directional movement-inducing servomotors 40 via the width directional servo drive units 106, thereby moving the slitters 1 in the width direction approximately parallel to the surface of the corrugated paperboard S.

Then, in step S23, the control device 102 controls the up-down directional movement mechanism to move each slitter 1 from the in-movement position to the up-down directional processing position or the up-down directional non-processing position in the up-down direction with the target acceleration/deceleration α set by the processing in FIG. 13. Specifically, the control device 102 operates to move two or more of the set of slitters which will be used in processing for the new order, from the in-movement position to an up-down directional processing position for the new order in the up direction, and move the remaining slitter(s) 1 which will not be used in processing for the new order, from an up-down directional non-processing position for the previous order, from the in-movement position to an up-down directional non-processing position for the new order in the down direction. In this case, the control device 102 controls the up-down directional movement-inducing servomotors 29 via the up-down directional servo drive units 104, thereby moving the slitters 1 in the up-down direction.

In the case where, in the step S21, the slitter(s) 1 which has (have) not been used in processing for the precious order is (are) kept at the up-down directional non-processing position, when such a slitter 1 kept at the up-down directional non-processing position is selected as a slitter to be used in processing for the new order, the slitter 1 may be moved from the up-down directional non-processing position to an up-down directional processing position in the up-down direction. On the other hand, any slitter 1 which is not used in processing for either the precious order or the new order may be just kept at the up-down directional non-processing position.

Then, in step S24, upon completion of the setup of the set of slitters 1, the control device 102 performs control for starting processing by the two or more slitters 1 for the new order.

Functions and Effects

Next, functions and effects of the slitter-scorer apparatus 100 according to the above embodiment will be described.

In the above embodiment, the control device 102 of the slitter-scorer apparatus 100 is configured to: set the target setup time necessary to move the corrugated paperboard-processing tool 100a in the width direction and the up-down direction so as to change the position of the corrugated paperboard-processing tool 100a for an order change, based on the cutter cutoff length L along the feed direction FW of a portion of the corrugated paperboard S to be cut off by the cutter 520 during the order change, and the paperboard feed speed $V_L$; set the target acceleration/deceleration α with which the corrugated paperboard-processing tool 100a is to be moved during the order change, such that the movement of the corrugated paperboard-processing tool 100a for the order change is completed in the target setup time; and control the width directional movement mechanism and the up-down directional movement mechanism, such that the corrugated paperboard-processing tool 100a is moved with the target acceleration/deceleration α during the order change.

As above, in the above embodiment, the control device 102 operates to set the target acceleration/deceleration α depending on the cutter cutoff length L to be adopted during the order change, and a current corrugated feed speed $V_L$, differently from a comparative example in which the target acceleration/deceleration is set from a viewpoint of reducing the setup time, i.e., with a view to reducing the setup time, the target acceleration/deceleration is set to a relatively large value (typically to a maximum value determined by performance of the movement mechanism, or the like). Thus, in the above embodiment, the target acceleration/deceleration α is set to a value appropriate to the current cutter cutoff length L and the paperboard feed speed $V_L$, instead of being uniformly set to a relatively large value, as in the comparative example (basically, the target acceleration/deceleration in the above embodiment tends to become smaller than that in the comparative example).

This makes it possible to reduce a load imposed on the movement mechanism for the corrugated paperboard-processing tool 100a during the order change to appropriately suppress the progression of aging of the movement mechanism (wear of ball screws, etc.). On the other hand, in the above embodiment and the comparative example, since the corrugated paperboard S is cut by the cutter 520 at the same cutter cutoff length L during the order change, the length of a resulting defective sheet is the same. Thus, in the above embodiment, it is possible to appropriately ensure the yield of processed corrugated paperboards S to be produced, as with the comparative example. Accordingly, the slitter-scorer apparatus according to the above embodiment makes it possible to, during the order change, ensure the yield of processed corrugated paperboards S to be produced, while suppressing the progression of aging of for the movement mechanism for the corrugated paperboard-processing tool 100a.

In the above embodiment, the control device 102 is configured to set the target acceleration/deceleration α such that the movement of the corrugated paperboard-processing tool for the order change is completed in the target setup time, based on the cutter cutoff length L, the paperboard feed speed $V_L$, and the width directional movement distance and the up-down directional movement distance by which the corrugated paperboard-processing tool is to be moved for the order change. The target acceleration/deceleration α is set based on the cutter cutoff length L, the paperboard feed speed $V_L$, the width directional movement distance and the up-down directional movement distance, so that it is possible to accurately set the target acceleration/deceleration α so as to adequately realize the target setup time.

In the above embodiment, the control device 102 is configured to refer to the matrix table in which four parameters consisting of the cutter cutoff length L, the paperboard feed speed $V_L$, the width directional movement distance and the up-down directional movement distance are preliminarily associated with the target acceleration/deceleration α to be adopted correspondingly to the four parameters, and set the target acceleration/deceleration α corresponding to values of the four parameters to be set during the order change. The target acceleration/deceleration α is set using the preliminarily-created matrix table, so that it is possible to simplify processing required for the setting of the target acceleration/deceleration α. Specifically, as compared with a case where the target acceleration/deceleration α is set by performing computational processing or the like, when the target acceleration/deceleration α is set using the matrix table, control processing during the order change is not complicated, so that it is possible to suppress the occurrence of operating delay, etc.

In the above embodiment, a greatest one of a plurality of width directional movement distances by which a plurality of slitters 52 are to be moved during the order change, respectively, and a greatest one of a plurality of width directional movement distances by which a plurality of scorers 52 are to be moved during the order change, respectively, is adopted as the width directional movement distance for setting the target acceleration/deceleration α. In this case, the target acceleration/deceleration α is set based on the greatest width directional movement distance, so that the target acceleration/deceleration α is set to a larger value, as compared with a case of using other non-greatest width directional movement distances. Thus, the width directional movements of all the slitters required for the order change and the width directional movements of all the scorers required for the order change can be reliably completed in the setup time.

Additionally, in the above embodiment, a distance depending on the thickness of a thicker one of two types of corrugated paperboards S used before and after the order change is adopted as the up-down directional movement distance for setting the target acceleration/deceleration α. In this case, the target acceleration/deceleration α is set based on the up-down directional movement distance depending on the thickness of a thicker one of two types of corrugated paperboards S used before and after the order change, so that the target acceleration/deceleration α is set to a larger value, as compared with a case of using the up-down directional movement distance depending on the thickness of a thinner one of the two types of corrugated paperboards. Thus, the up-down directional movement to be performed during the order change depending on the thicknesses of the corrugated paperboards S used in the previous and new orders can be reliably completed in the target setup time.

In the above embodiment, the control device 102 is configured to: control the width directional movement mechanism such that, when the corrugated paperboard-processing tool 100a arrives at an intermediate position corresponding to one-half of the width directional movement distance, the width directional movement speed of the corrugated paperboard-processing tool 100a become a maximum speed; and control the up-down directional movement mechanism such that, when the corrugated paperboard-processing tool 100a arrives at an intermediate position corresponding to one-half of the up-down directional movement distance, the up-down directional movement speed of the corrugated paperboard-processing tool 100a become a maximum speed. In the above embodiment, with regard to both the width directional movement and the up-down directional movement of the corrugated paperboard-processing tool 100a, the control device 102 adopts a speed profile configured to increase the movement speed of the corrugated paperboard-processing tool 100a (i.e., accelerate the corrugated paperboard-processing tool 100a) until the corrugated paperboard-processing tool 100a arrives at the intermediate position of the distance by which it is to be moved, such that the movement speed becomes a maximum speed at the time when it arrives at the intermediate position, and after arriving at the intermediate position, decelerate the corrugated paperboard-processing tool 11a. In this case, as compared with a speed profile configured to increase the movement speed of the corrugated paperboard-processing tool 100a (i.e., accelerate the corrugated paperboard-processing tool 100a) such that the movement speed reaches a maximum speed just before the intermediate position, and then after maintaining the movement speed at the maximum speed for a certain time, decelerate the corrugated paperboard-processing tool 100a, the magnitude of acceleration/deceleration during the order change can be reduced. Thus, as compared with other speed profiles, the speed profile in the above embodiment makes it possible to effectively reduce a load imposed on the movement mechanism for the corrugated paperboard-processing tool 100a.

In the above embodiment, the control device 102 is configured to: calculate the shortest defective length which is equivalent to a distance by which the corrugated paperboard S is moved in the feed direction FW while the corrugated paperboard-processing tool 100a is moved during the order change, when the corrugated paperboard-processing tool 100a is moved with the maximum acceleration/deceleration; when the calculated shortest defective length is less than the cutter cutoff length L, set the target acceleration/deceleration α such that the movement of the corrugated paperboard-processing tool 100a during the order change is completed in the target setup time; and when the calculated shortest defective length is equal to or greater than the cutter cutoff length L, set the target acceleration/deceleration α to the maximum acceleration/deceleration. Thus, the target acceleration/deceleration α can be set to an adequate value depending on a magnitude relationship between the shortest defective length and the cutter cutoff length L. In particular, when the calculated shortest defective length is equal to or greater than the cutter cutoff length L, the target acceleration/deceleration α is set to the maximum acceleration/deceleration, so that the movement of the corrugated paperboard-processing tool 100a during the order change can be completed in the shortest setup time.

In the above embodiment, the control device 102 is configured to set the target acceleration/deceleration α to same values when the corrugated paperboard-processing tool 100a is moved in respective ones of the width direction and the up-down direction, such that the movement of the corrugated paperboard-processing tool 100a for the order change is completed in the target setup time. The target acceleration/deceleration α for the width directional movement and the target acceleration/deceleration α for the up-down directional movement are set to the same values, so that it is possible to simplify processing required for the setting of the target acceleration/deceleration α.

In the above embodiment, a preliminarily set fixed length is adopted as the given cutoff length L. Thus, during the order change, a defective sheet can be appropriately cut off by the cutter 520, at the preliminarily set fixed length. Such a defective sheet cut off in this manner can be utilized as an underlay board for a stack of non-defective sheets, or the like.

Modifications

Next, some modifications of the above embodiment will be described.

First Modification

In the above embodiment, a defective zone of the corrugated paperboard S which occurred during the order change is cut off by the cutter 520 at the fixed length. Alternatively, in the first modification, the defective zone of the corrugated paperboard S may be cutoff at a length depending on a defective length thereof, instead of the fixed length. As mentioned above, in the former case, the fixed length is adopted as the cutter cutoff length, and in the latter case, the limited cutter cutoff length depending on the paperboard feed speed $V_L$ is adopted as the cutter cutoff length.

Specifically, in the first modification, the control device 102 compares the shortest defective length with the limited cutter cutoff length, in the step S16 illustrated in FIG. 13. In this case, the control device 102 may refer to a preliminarily-created corresponding table between the paperboard feed speed $V_L$ and the limited cutter cutoff length, and use a value of the limited cutter cutoff length corresponding to a current value of the paperboard feed speed $V_L$. Then, as a result of the comparison, when the shortest defective length is equal to or greater than the limited cutter cutoff length, the control device 102 sets the target acceleration/deceleration α for the corrugated paperboard-processing tool 100a, which is capable of realizing the target setup time $T_t$ corresponding to the shortest defective length. In this case, since the target setup time $T_t$ becomes the shortest setup time, the control device 102 sets the target acceleration/deceleration α for the corrugated paperboard-processing tool 100a to the maximum acceleration/deceleration $α_{max}$ so as to realize the shortest setup time. Further, in this case, the shortest defective length is set as the cutter cutoff length, and the cutter 520 will cut off a defective sheet corresponding to the shortest defective length.

On the other hand, when the shortest defective length is less than the limited cutter cutoff length, the control device 102 sets the target acceleration/deceleration α for the corrugated paperboard-processing tool 100a, which is capable of realizing the target setup time $T_t$ corresponding to the limited cutter cutoff length. Specifically, the control device 102 refers to the matrix table stored in the storage unit to read out the target acceleration/deceleration α to be adopted correspondingly to the cutter cutoff length L as the limited cutter cutoff length, a current value of the paperboard feed speed $V_L$, and the up-down directional movement distance Y and the width directional movement distance X, and sets the read target acceleration/deceleration α. In this case, the limited cutter cutoff length is set as the cutter cutoff length, and the cutter 520 will cut off a defective sheet corresponding to the limited cutter cutoff length.

As above, in the first modification, the limited cutter cutoff length depending on the paperboard feed speed $V_L$ is adopted as the cutter cutoff length L. Thus, during the order change, when the shortest defective length is less than the limited cutter cutoff length, a defective sheet can be appropriately cut off by the cutter 520 at the limited cutter cutoff length depending on the paperboard feed speed $V_L$. It should be noted that the present invention is not limited to adopting the limited cutter cutoff length itself as the cutter cutoff length L, but a length derived by adding a given margin to the limited cutter cutoff length may be adopted as the cutter cutoff length L.

Second Modification

In the above embodiment, the control device 102 is configured to, during the order change, move the corrugated paperboard-processing tool 100a in the down direction, and then, after moving the corrugated paperboard-processing tool 100a in the width direction, move the corrugated paperboard-processing tool 100a in the up direction (see FIG. 11B). That is, the control device 102 is configured to perform the up-down directional movement and the width directional movement of the corrugated paperboard-processing tool 100a, separately. In the second modification, the control device 102 may be configured to simultaneously perform the up-down directional movement and the width directional movement of the corrugated paperboard-processing tool 100a. Specifically, the control device 102 may be configured to move the corrugated paperboard-processing tool 100a in the width direction while moving the corrugated paperboard-processing tool 100a in the up-down direction. A combinational movement of an up-down directional movement and a width directional movement will hereinafter be referred to as "oblique directional movement", as appropriate (similarly, a combinational direction of the up-down direction and the width direction will hereinafter be also referred to as "oblique direction", as appropriate).

In this second modification, the control device 102 may set the target acceleration/deceleration α such that a setup time $T_r$ derived by summing an up-down directional movement time and a width directional movement time is coincident with the target setup time $T_r$ (see the formula (3)). In one example, the corrugated paperboard-processing tool 100a may be moved in the width direction while being moved from the up-down directional intermediate position (intermediate position between up-down directional processing position and the in-movement position) to the in-movement position in the down direction, and may be moved in the width direction while being moved from the in-movement position to the intermediate position in the up direction. That is, the control device 102 may be configured to move the corrugated paperboard-processing tool 100a in an oblique direction between the up-down directional intermediate position and the in-movement position. In this embodiment, the control device 102 may use, as the target setup time $T_r$, a setup time $(Tr=t_1+t_2)$ derived by subtracting a time $(2\times(t_1/2))$ of the two oblique directional movements each overlapping a respective one of the two up-down directional movements from the total $(2t_1+t_2)$ of a time $(2\times t_1)$ of the two up-down directional movements and a time $(t_2)$ of the width directional movement.

The oblique directional movement of the corrugated paperboard-processing tool 100a is not limited to being performed between the up-down directional intermediate position and the in-movement position. Preferably, the oblique directional movement of the corrugated paperboard-processing tool 100a may be performed at an up-down directional position where the corrugated paperboard-processing tool 100a does not perform any processing for the corrugated paperboard S during the order change.

Third Modification

In the above embodiment, the control device 102 is configured to set the target acceleration/deceleration during the up-down directional movement of the corrugated paperboard-processing tool 100a and the target acceleration/deceleration during the width directional movement of the corrugated paperboard-processing tool 100a to the same values. Alternatively, in the third modification, the control device 102 may be configured to set the target acceleration/deceleration during the up-down directional movement of the corrugated paperboard-processing tool 100a and the target acceleration/deceleration during the width directional movement of the corrugated paperboard-processing tool 100a to different values. For example, the control device 102 may be configured to set the target acceleration/deceleration during the up-down directional movement to the fixed value, and variably set only the target acceleration/deceleration during the width directional movement. In this case, the control device 102 may be configured to appropriately adjust the target acceleration/deceleration during the width directional movement, based on the above-mentioned target setup time $T_r$.

Fourth Modification

While the above embodiment has been described based on an example where the present invention is applied to the slitter-scorer apparatus 100 comprising both the slitters 1 and the scorers 52, the present invention may be applied to a machine comprising only the slitters 1 or a machine comprising only the scorers 52 (in this case, the "corrugated paperboard-processing tool 100a" consists only of either the slitters 1 or the scorers 52).

Fifth Modification

In the above embodiment, the control device 102 is incorporated in the slitter-scorer apparatus 100, wherein the control device 102 operates to set the target setup time necessary to move the corrugated paperboard-processing tool 100a in the width direction and the up-down direction for an order change; set the target acceleration/deceleration such that the movement of the corrugated paperboard-processing tool 100a for the order change is completed in the target setup time; and control the width directional movement mechanism and the up-down directional movement mechanism, such that the corrugated paperboard-processing tool 100a is moved with the target acceleration/deceleration during the order change.

In the fifth modification, the control device 102 is incorporated in the upper-level production management device 112 for managing the entire corrugator line, wherein the upper-level production management device 112 operates to set the target setup time and the target acceleration/deceleration, and control the width directional movement mechanism and the up-down directional movement mechanism.

In this case, in the electrical configuration of the slitter-scorer apparatus 100 illustrated in FIG. 9, the width directional movement-inducing servomotors and the up-down directional movement-inducing servomotors for the corrugated paperboard-processing tool 100a are connected to the upper-level production management device 112 via corresponding ones of the width directional servo drive units and the up-down directional servo drive units. Further, the general-purpose operation unit 110 is connected to the upper-level production management device 112. Further, the matrix table defining the target acceleration/deceleration with which the corrugated paperboard-processing tool 100a is to be moved during the order change is stored in a storage unit of the upper-level production management device 112.

Further, the target acceleration/deceleration setting processing for the slitters 1 illustrated in FIG. 13 and a similar target acceleration/deceleration setting processing for the scorers 52 are executed by the upper-level production management device 112. In this case, the step S11 (step of acquiring, by the control device 102, various pieces of information from the upper-level production management device 112) of the flowchart is omitted. Further, the setup processing for the slitters 1 illustrated in FIG. 14 and a similar setup processing for the scorers 52 are also executed by the upper-level production management device 112.

What is claimed is:

1. A slitter-scorer apparatus configured to give slit lines and score lines in a stream of continuous corrugated paperboards being fed in a feed direction, the stream of continuous corrugated paperboards being cut into individual corrugated paperboards after the stream of continuous corrugated paperboards is given the slit lines and the score lines, the slitter-scorer apparatus comprising:

a corrugated paperboard-processing tool comprising a plurality of slitters arranged in parallel in a width direction orthogonal to the feed direction and configured to give the slit lines in the stream of corrugated paperboards along the feed direction, and the corrugated paperboard-processing tool further comprising a plurality of scorers arranged in parallel in the width direction and configured to give the score lines in the stream of corrugated paperboards along the feed direction;

width directional movement mechanisms provided, respectively, in the plurality of slitters and the plurality of scorers and configured to move the plurality of slitters and the plurality of scorers in the width direction;

up-down directional movement mechanisms provided, respectively, in the plurality of slitters and the plurality of scorers and configured to move the plurality of slitters and the plurality of scorers in an up-down direction; and a controller configured to control the width directional movement mechanisms and the up-down directional movement mechanisms, upon a receipt of an order change by the controller, to reposition the slit lines and the score lines in the stream of corrugated paperboards in such a manner as to:

set a target setup time to complete repositioning of the plurality of slitters and the plurality of scorers of the corrugated paperboard-processing tool in the width direction and the up-down direction to meet the order change, based on a cutoff length and a feed speed of the stream of corrugated paperboards, wherein the cutoff length is a length measured in the feed direction that is cut off from the stream of corrugated paperboards to remove a portion of the stream of corrugated paperboards, wherein the slit lines and the score lines are repositioned over the length to meet the order change;

set a target acceleration/deceleration according to which the plurality of slitters and the plurality of scorers of the corrugated paperboard-processing tool need to be repositioned to meet the order change, wherein the target acceleration/deceleration is set to complete repositioning of the plurality of slitters and the plurality of scorers of the corrugated paperboard-processing tool within the target setup time; and control the width directional movement mechanisms and the up-down directional movement mechanisms to reposition the plurality of slitters and the plurality of scorers of the corrugated paperboard-processing tool at the target acceleration/deceleration.

2. The slitter-scorer apparatus according to claim 1, wherein the controller is configured to set the target acceleration/deceleration such that the corrugated paperboard-processing tool completes repositioning of the plurality of slitters and the plurality of scorers within the target setup time, and further wherein the controller is programmed to set the target acceleration/deceleration based on parameters including the cutoff length, the feed speed, and a width directional movement distance and an up-down directional movement distance by which the corrugated paperboard-processing tool needs to be repositioned to meet the order change.

3. The slitter-scorer apparatus according to claim 2, wherein the controller is configured to refer to a matrix table in which the parameters including the cutoff length, the feed speed, the width directional movement distance and the up-down directional movement distance are preliminarily associated with the target acceleration/deceleration to be adopted correspondingly to the parameters, and further wherein the controller is configured to select the target acceleration/deceleration from the matrix table that corresponds to values of the parameters to be adopted to meet the order change.

4. The slitter-scorer apparatus according to claim 2, wherein the controller is configured to adopt, as the width directional movement distance, a greatest one of a plurality of width directional movement distances by which the plurality of slitters need to be repositioned to meet the order change, respectively, and a greatest one of a plurality of width directional movement distances by which the plurality of scorers need to be repositioned to meet the order change, respectively.

5. The slitter-scorer apparatus according to claim 2, wherein the controller is configured to adopt, as the width directional movement distance, a plurality of width directional movement distances by which the plurality of slitters need to be repositioned to meet the order change, respectively, and a plurality of width directional movement distance by which the plurality of scorers need to be repositioned to meet the order change, respectively.

6. The slitter-scorer apparatus according to claim 2, wherein the controller is configured to adopt, as the up-down directional movement distance, a distance depending on a thickness of a thicker one of two types of corrugated paperboards used before and after the order change.

7. The slitter-scorer apparatus according to claim 1, wherein the controller is configured to:

control the width directional movement mechanisms such that a width directional movement speed of the corrugated paperboard-processing tool becomes a maximum speed when the corrugated paperboard-processing tool arrives at an intermediate position corresponding to one-half of a width directional movement distance by which the corrugated paperboard-processing tool needs to be repositioned to meet the order change; and control the up-down directional movement mechanisms such that an up-down directional movement speed of the corrugated paperboard-processing tool becomes a maximum speed when the corrugated paperboard-processing tool arrives at an intermediate position corresponding to one-half of an up-down directional movement distance by which the corrugated paperboard-processing tool needs to be repositioned to meet the order change.

8. The slitter-scorer apparatus according to claim 1, wherein the controller is configured to:

calculate a shortest defective length which is equivalent to a distance by which the stream of corrugated paperboards are moved in the feed direction while the corrugated paperboard-processing tool is repositioned to meet the order change, when the corrugated paperboard-processing tool is moved in the width direction and the up-down direction, respectively, at a maximum acceleration/deceleration which can be set for the width directional movement mechanisms and the up-down directional movement mechanisms, so as to reposition the corrugated paperboard-processing tool to meet the order change;

when the calculated shortest defective length is less than the cutoff length, set the target acceleration/deceleration such that the corrugated paperboard-processing tool completes repositioning of the plurality of slitters and the plurality of scorers within the target setup time; and when the calculated shortest defective length is equal to or greater than the cutoff length, set the target acceleration/deceleration to the maximum acceleration/deceleration.

9. The slitter-scorer apparatus according to claim 1, wherein the controller is configured to set the target acceleration/deceleration to same values when the corrugated paperboard-processing tool is moved in the width direction and the up-down direction, such that the corrugated paperboard-processing tool completes repositioning of the plurality of slitters and the plurality of scorers to meet the order change within the target setup time.

10. The slitter-scorer apparatus according to claim 1, wherein the controller is configured to adopt a preliminarily set fixed length as the cutoff length.

11. The slitter-scorer apparatus according to claim 1, wherein the controller is configured to adopt, as the cutoff length, a length corresponding to a minimum length, along the feed direction, of a minimum portion of corrugated paperboard which can be cut off from the stream of corrugated paperboards depending on the feed speed.

12. The slitter-scorer apparatus according to claim 1, further comprising a display configured to display the target acceleration/deceleration set by the controller.

* * * * *